(12) United States Patent
Srinath et al.

(10) Patent No.: US 10,771,434 B1
(45) Date of Patent: Sep. 8, 2020

(54) ROUTE SIGNALING DRIVEN SERVICE MANAGEMENT

(71) Applicant: Juniper Networks, Inc., Sunnyvale, CA (US)

(72) Inventors: Harsha Srinath, Fremont, CA (US); Gregory M. Dalle, Charlestown, MA (US); Dhiraj D. Ballal, Santa Clara, CA (US); Manas Pal, Sunnyvale, CA (US); Jacopo Pianigiani, Cupertino, CA (US); Sanjay Agrawal, San Ramon, CA (US); Sandesh Kumar Sodhi, Sunnyvale, CA (US); Saravanadas P. Subramanian, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 16/369,915

(22) Filed: Mar. 29, 2019

Related U.S. Application Data

(63) Continuation of application No. 15/377,777, filed on Dec. 13, 2016, now Pat. No. 10,250,562, which is a continuation-in-part of application No. 14/871,492, filed on Sep. 30, 2015, now Pat. No. 9,985,875.

(60) Provisional application No. 62/141,249, filed on Mar. 31, 2015, provisional application No. 62/141,240, filed on Mar. 31, 2015.

(51) Int. Cl.
*H04L 29/06* (2006.01)

(52) U.S. Cl.
CPC ...... *H04L 63/0263* (2013.01); *H04L 63/0209* (2013.01)

(58) Field of Classification Search
None
See application file for complete search history.

(56) References Cited

U.S. PATENT DOCUMENTS 6,822,954 B2  11/2004  McConnell et al.
6,928,576 B2   8/2005  Sekiguchi
(Continued)

FOREIGN PATENT DOCUMENTS

WO   2013144746 A1   10/2013

OTHER PUBLICATIONS

"Branch SRX Series Active/Passive Cluster Implementation Guide," Juniper Networks, Inc., Dec. 2009, 12 pp.
(Continued)

*Primary Examiner* — Chi H Pham
*Assistant Examiner* — Vladislav Y Agureyev
(74) *Attorney, Agent, or Firm* — Shumaker & Sieffert, P.A.

(57) ABSTRACT

A system and method for modifying services provided by one or more network devices. A processor of a first network device identifies defined events in each of a plurality of applications, including a first defined event associated with a first application. The processor assigns a signal-route to each defined event. The processor then executes the first application and, when the processor detects occurrence of the first defined event during execution of the first application, the processor modifies services provided by a second network device by adding the first signal-route to or removing the first signal-route from a routing information base (RIB) on the first network device and advertising, to the second network device, the change in the RIB.

20 Claims, 18 Drawing Sheets

(56) References Cited

U.S. PATENT DOCUMENTS

| | | | |
|---|---|---|---|
| 7,184,437 B1 | 2/2007 | Cole et al. | |
| 7,286,545 B1 | 10/2007 | Tester et al. | |
| 7,549,078 B2 | 6/2009 | Harvey et al. | |
| 7,633,874 B1* | 12/2009 | Nalawade | H04L 45/04 |
| | | | 370/238 |
| 7,657,657 B2 | 2/2010 | Rao et al. | |
| 7,783,600 B1 | 8/2010 | Spertus et al. | |
| 8,050,559 B2 | 11/2011 | Sindhu | |
| 8,339,959 B1 | 12/2012 | Moisand et al. | |
| 8,369,345 B1 | 2/2013 | Raghunathan et al. | |
| 8,607,346 B1* | 12/2013 | Hedge | H04L 63/1416 |
| | | | 726/11 |
| 8,612,612 B1 | 12/2013 | Dukes et al. | |
| 8,756,412 B2 | 6/2014 | Pulini et al. | |
| 8,799,419 B1* | 8/2014 | Lin | H04L 45/586 |
| | | | 709/220 |
| 8,913,484 B2 | 12/2014 | Kompella et al. | |
| 9,258,212 B2* | 2/2016 | Pfeifer | H04L 45/124 |
| 9,311,198 B2 | 4/2016 | Rubin et al. | |
| 9,444,768 B1 | 9/2016 | Raghunathan et al. | |
| 9,459,903 B2 | 10/2016 | Gray | |
| 9,686,181 B2 | 6/2017 | Akiya et al. | |
| 9,755,960 B2 | 9/2017 | Moisand et al. | |
| 9,843,973 B2 | 12/2017 | Rubin et al. | |
| 9,985,875 B1 | 5/2018 | Srinath et al. | |
| 10,069,903 B2 | 9/2018 | Sorenson, III et al. | |
| 10,210,058 B1 | 2/2019 | Srinath et al. | |
| 10,250,562 B1 | 4/2019 | Srinath et al. | |
| 10,341,921 B2 | 7/2019 | Rubin et al. | |
| 2004/0008700 A1 | 1/2004 | Visser et al. | |
| 2004/0090913 A1 | 5/2004 | Scudder et al. | |
| 2005/0240681 A1 | 10/2005 | Fujiwara et al. | |
| 2005/0289244 A1 | 12/2005 | Sahu et al. | |
| 2006/0187942 A1 | 8/2006 | Mizutani et al. | |
| 2006/0233180 A1 | 10/2006 | Serghi et al. | |
| 2006/0256801 A1 | 11/2006 | Endo | |
| 2006/0291378 A1 | 12/2006 | Brotherston et al. | |
| 2007/0079012 A1 | 4/2007 | Walker | |
| 2007/0086461 A1 | 4/2007 | Ward et al. | |
| 2007/0109592 A1 | 5/2007 | Parvathaneni et al. | |
| 2007/0169149 A1 | 7/2007 | Jennings et al. | |
| 2007/0180311 A1 | 8/2007 | Harvey et al. | |
| 2007/0253328 A1 | 11/2007 | Harper et al. | |
| 2008/0225699 A1 | 9/2008 | Lee | |
| 2010/0042712 A1 | 2/2010 | Lindem et al. | |
| 2010/0267390 A1 | 10/2010 | Lin | |
| 2011/0131645 A1 | 6/2011 | Johnson et al. | |
| 2011/0258433 A1 | 10/2011 | Pulini et al. | |
| 2012/0239966 A1 | 9/2012 | Kompella | |
| 2012/0281540 A1 | 11/2012 | Khan et al. | |
| 2013/0051219 A1 | 2/2013 | Bajamahal | |
| 2013/0201909 A1* | 8/2013 | Bosch | H04L 45/64 |
| | | | 370/328 |
| 2013/0265881 A1* | 10/2013 | Filsfils | H04L 43/00 |
| | | | 370/241 |
| 2013/0343174 A1 | 12/2013 | Guichard et al. | |
| 2014/0003227 A1* | 1/2014 | Scudder | H04L 45/021 |
| | | | 370/218 |
| 2014/0016454 A1* | 1/2014 | Ramaiah | H04L 69/16 |
| | | | 370/217 |
| 2014/0211800 A1* | 7/2014 | Chunduri | H04L 61/103 |
| | | | 370/392 |
| 2014/0237138 A1 | 8/2014 | Xu et al. | |
| 2014/0269726 A1* | 9/2014 | Day | H04L 45/021 |
| | | | 370/392 |
| 2014/0289303 A1 | 9/2014 | Tarricone et al. | |
| 2014/0321265 A1 | 10/2014 | Pitchai et al. | |
| 2014/0328161 A1 | 11/2014 | Haddad et al. | |
| 2014/0362681 A1 | 12/2014 | Bahadur et al. | |
| 2015/0016249 A1 | 1/2015 | Mukundan et al. | |
| 2015/0092551 A1 | 4/2015 | Moisand et al. | |
| 2015/0271052 A1* | 9/2015 | Chunduri | H04L 45/12 |
| | | | 370/400 |
| 2015/0326471 A1* | 11/2015 | Anandan | H04L 12/4633 |
| | | | 370/228 |
| 2015/0334595 A1 | 11/2015 | Bosch et al. | |
| 2016/0014023 A1* | 1/2016 | He | H04L 45/64 |
| | | | 370/408 |
| 2016/0241457 A1* | 8/2016 | Semwal | H04L 65/1069 |
| 2016/0241463 A1* | 8/2016 | D'Souza | H04L 45/22 |
| 2016/0301724 A1 | 10/2016 | Kodaypak | |
| 2017/0064717 A1* | 3/2017 | Filsfils | H04L 47/17 |
| 2017/0180765 A1 | 6/2017 | Jennings et al. | |
| 2017/0366452 A1 | 12/2017 | Moisand et al. | |
| 2018/0227229 A1* | 8/2018 | Lopez | H04L 45/306 |

OTHER PUBLICATIONS

"Concepts & Examples Screen OS Reference Guide—vol. 11: High Availability. Release 6.1.0, Revision 3," Juniper Networks, Inc., Applicant points out, in accordance with MPEP 609.04(a), that the year of publication, 2009, is sufficiently earlier than the effective U.S. filing date, Sep. 30, 2015, so that the particular month of publication is not in issue, 106 pp.

"Concepts & Examples ScreenOS Reference Guide—High Availability Revision 2," Juniper Networks, Inc., Dec. 10, 2012, 120 pp.

"Configuring Basic Settings for the SRX650 Services Gateway with the CLI or the J-Web Interface," Juniper Networks, Inc., Jun. 10, 2013, accessed on Apr. 18, 2017, from https://www.juniper.net/documentation/en_US/release-independent/junos/topics/task/configuration/services-gateway-srx650-configuring-config-editor.html, 4 pp.

"Configuring ICCP for MC-LAG," Juniper Networks, Inc., Dec. 11, 2012, accessed on Mar. 23, 2017, from http://www.juniper.net/documentation/en_US/junos/topics/task/configuration/interfaces-configuring-iccp-for-mc-lag.html, 2 pp.

"Deployment Guide for SRX Series Services Gateways in Chassis Cluster Configuration—Version 1.3," Juniper Networks, Inc., Feb. 2014, 35 pp.

"Firewall Filter Match Conditions Based on Address Classes," Support, Juniper Networks, Inc., Mar. 26, 2015, 1 pp.

"Guidelines for Configuring Firewall Filters," Support, Juniper Networks, Inc., Jun. 16, 2016, 5 pp.

"Implementing MC-LAG Active/Active with VRRP," Juniper Networks, Inc., Apr. 20, 2015, accessed on Apr. 18, 2017, from https://www.juniper.net/documentation/en_US/release-independent/nce/topics/concept/mf-mc-lag-active-vrrp-Implementing.html, 2 pp.

"Network Configuration," Juniper Networks, Inc., Apr. 20, 2015, accessed on Apr. 18, 2017, from https://www.juniper.net/documentation/en_US/release-independent/nce/topics/concept/mf-architecture-network-configuration.html, 14 pp.

"Understanding Chassis Cluster Redundancy Group Failover," Juniper Networks, Inc., Jan. 6, 2013, accessed on Apr. 18, 2017, from https://www.juniper.net/documentation/en_US/junos/topics/concept/chassis-cluster-redundancy-group-failover-understanding.html, 2 pp.

"Understanding the AS path and AS path prepending," Noction Network Intelligence, accessed from https://www.noction.com/blog/as-path-and-as-path-prepending, Oct. 19, 2015, 5 pp.

Cameron et al., "Juniper SRX Series: Chapter 1 SRX GUI Management," O'Reilly Media, Inc., Jun. 2013, 42 pp.

Cameron et al., "Juniper SRX Series: Chapter 4. SRX Networking Basics," O'Reilly Media, Inc., Jun. 2013, 60 pp.

Cameron et al., "Juniper SRX Series: Chapter 5. System Services," O'Reilly Media, Inc., Jun. 2013, 68 pp.

Cameron et al., "Juniper SRX Series: Chapter 7. High Availability," O'Reilly Media, Inc., Jun. 2013, 100 pp.

Prosecution history of U.S. Appl. No. 14/871,492, Juniper Networks, Inc. (inventor: Srinath et al.) dated Aug. 7, 2017 through Jan. 22, 2018, 60 pp.

Prosecution history of U.S. Appl. No. 15/377,777, Juniper Networks, Inc. (inventor: Srinath et al.) dated Jun. 14, 2018 through Dec. 13, 2018, 44 pp.

U.S. Appl. No. 16/278,317 filed Feb. 18, 2019, Juniper Networks, Inc. (inventor: Srinath et al.) entitled Inter-Application Communication Via Signal-Routes.

(56) References Cited

OTHER PUBLICATIONS

U.S. Appl. No. 16/051,047, filed Jul. 31, 2018, Juniper Networks, Inc. (inventor: Srinath et al.) entitled N:1 Stateful Application Gateway Redundancy Model.
Prosecution history of U.S. Appl. No. 14/871,405, Juniper Networks, Inc. (inventor: Srinath et al.) dated Apr. 26, 2017 through Jan. 11, 2019, 156 pp.

* cited by examiner

| ROUTE 1 | ROUTE 2 | ROUTE 3 | ROUTE 4 | ROUTE 5 | ROUTE 6 |
|---|---|---|---|---|---|
| 1 | 0 | 1 | 1 | 0 | 1 |

| SDG1 policy-statement BGP-EXPORT-DEF-ONLY | BGP-EXPORT-DEF-ONLY continued |
|---|---|
| root@sdg1# show policy-options policy-statement BGP-EXPORT-DEF-ONLY<br><br>term SKIP_PREPEND_RT_PRESENT {<br>  from {<br>    protocol [ static bgp ];<br>    prefix-list default-route;<br>    condition ROUTE_PRESENT;<br>  }<br>  then {<br>    next-hop self;<br>    accept;<br>  }<br>} | term UPDATE_LOC_PREF_RT_ABSENT {<br>  from {<br>    protocol [ static bgp ];<br>    prefix-list default-route;<br>  }<br>  then {<br>    as-path-prepend "64674 64674 64674";<br>    next-hop self;<br>    accept;<br>  }<br>}<br>root@sdg1# |

FIG. 9

| Status | SDG1 | SDG2 |
|---|---|---|
| Bootup | static {<br>  route 0.0.0.0/0 {<br>    preference 170;<br>    preference2 4294966895; #400<br>  }<br>} | static {<br>  route 0.0.0.0/0 {<br>    preference 170;<br>    preference2 4294966895; #400<br>  }<br>} |
| SDG1 Master | policy-statement SDG-HA-EXPORT<br>term UPDATE_LOC_PREF_RT_PRESENT {<br>  from {<br>    protocol [ static bgp ];<br>    prefix-list IPV4-DEFAULT-ROUTE;<br>    condition ROUTE_PRESENT;<br>  }<br>  then {<br>    local-preference 450;<br>  }<br>} | show policy-options policy-statement SDG-HA-EXPORT<br>term UPDATE_LOC_PREF_RT_PRESENT {<br>  from {<br>    protocol [ static bgp ];<br>    prefix-list IPV4-DEFAULT-ROUTE;<br>    condition ROUTE_PRESENT;<br>  }<br>  then {<br>    local-preference 350;<br>    accept;<br>  }<br>} |
| SDG2 Master | #Defaults to 400 | show policy-options policy-statement SDG-HA-EXPORT<br>term UPDATE_LOC_PREF_RT_ABSENT {<br>  from {<br>    protocol [static bgp];<br>    prefix-list IPV4-DEFAULT-ROUTE;<br>  }<br>  then {<br>    local-preference 450;<br>    accept;<br>  }<br>} |

FIG. 10

ROUTE SIGNALING DRIVEN SERVICE MANAGEMENT

This application is a continuation of U.S. patent application Ser. No. 15/377,777, filed Dec. 13, 2016, which is a continuation-in-part of U.S. patent application Ser. No. 14/871,492, filed Sep. 30, 2015, each of which are incorporated herein by reference in their respective entireties. U.S. patent application Ser. No. 14/871,492 claims the benefit of U.S. Provisional Application Nos. 62/141,240 and 62/141,249, both filed Mar. 31, 2015, each of which are incorporated herein by reference in their respective entireties.

TECHNICAL FIELD

The techniques of this disclosure relate to computer networks and, more specifically, to the use of firewalls within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information.

The goal of high availability computer network environments is to provide users and other entities with "always on" service. That is, high availability computer network environments should provide reliable, continuous operation service. To accomplish this, network devices in a high availability environment perform error detection and implement recoverability for detected errors. Unfortunately, network devices occasionally fail.

When a network device fails, all network traffic flowing through the failed network device may cease. For an enterprise that depends on such network traffic, this may be unacceptable, even if this failure occurs only for a short time. To minimize the possibility of a failure causing all network traffic to cease, redundant hardware such as a standby controller or a separate standby network device may be installed. When the primary controller fails, this primary controller (which may also be referred to as a "master controller") may switch over (or, in other words, fail-over) to the standby controller. Likewise, when the primary network device fails, this primary network device (which may also be referred to as a "master network device") may switch over (or, in other words, fail-over) to the standby network device. After failing over or switching over to the standby device, the standby device becomes the master device.

Redundancy in devices or controllers that extends across two or more chassis provides enhanced reliability. Current inter-chassis redundancy solutions, however, are geared toward providing redundancy across two homogeneous chassis within the same network. A typical network, however, is not a collection of homogeneous chassis.

SUMMARY

In general, a framework is described for managing services provided by two or more network elements. The framework leverages routing protocols to manage services across the two or more network elements, such as modifying firewall services or redirecting traffic between service gateways. The network elements may be homogeneous or heterogeneous (physical or virtual) and may be spread across different networks or across geographies. The mechanism provides service management agnostic of underlying network protocols.

In one example, in a system having a plurality of network devices, wherein the plurality of network devices includes a first network device and a second network device, a method of modifying services provided by one or more of the network devices, the method comprises identifying defined events in each of a plurality of applications, wherein the plurality of applications includes a first application and wherein the defined events include a first defined event associated with the first application, assigning a signal-route to each defined event, wherein assigning a signal-route to each defined event includes assigning a first signal-route to the first defined event, executing the first application within the first network device, detecting occurrence of the first defined event within the first application executing on the first network device, and in response to detecting occurrence of the first defined event within the first application executing on the first network device, modifying one or more services provided by the second network device, where modifying one or more services includes modifying the first signal-route in a routing information base (RIB) of the first network device, wherein modifying includes adding the first signal-route to or removing the first signal-route from the RIB and advertising, from the first network device to the second network device, the change in the RIB.

According to another example, a system includes a network and a plurality of network devices connected by the network, wherein each network device includes a memory and one or more processors connected to the memory, wherein the memory stores instructions that, when executed by the one or more processors, cause the one or more processors to identify defined events in each of a plurality of applications, wherein the plurality of applications includes a first application and wherein the defined events include a first defined event associated with the first application, assign a signal-route to each defined event, wherein assigning a signal-route to each defined event includes assigning a first signal-route to the first defined event, execute the first application, detect occurrence of the first defined event within the executing first application, and in response to detecting occurrence of the first defined event within the first application executing on the first network device, modify one or more services provided by another one of the network devices, where modifying one or more services includes modifying the first signal-route in a routing information base (RIB), wherein modifying includes adding the first signal-route to or removing the first signal-route from the RIB and advertising the change in the RIB.

According to another example, a non-transitory computer-readable storage medium stores instructions that, when executed, cause one or more processors to identify defined events in each of a plurality of applications, wherein the plurality of applications includes a first application and wherein the defined events include a first defined event associated with the first application; assign a signal-route to each defined event, wherein assigning a signal-route to each defined event includes assigning a first signal-route to the first defined event; execute the first application; detect occurrence of the first defined event within the executing first application; and, in response to detecting occurrence of the first defined event within the first application executing on the first network device, modify one or more services provided by another one of the network devices, where modifying one or more services includes modifying the first signal-route in a routing information base (RIB), wherein modifying includes adding the first signal-route to or removing the first signal-route from the RIB and advertising the change in the RIB.

The details of one or more embodiments of the techniques are set forth in the accompanying drawings and the description below. Other features, objects, and advantages of the techniques will be apparent from the description and drawings, and from the claims.

BRIEF DESCRIPTION OF DRAWINGS

FIG. 9 is a diagram illustrating advertising the presence or absence of a signal-route through the use of an as-path-prepend command.

FIG. 10 is a diagram illustrating advertising the presence or absence of a signal-route through the use of local-preference values.

DETAILED DESCRIPTION

Figure 1:
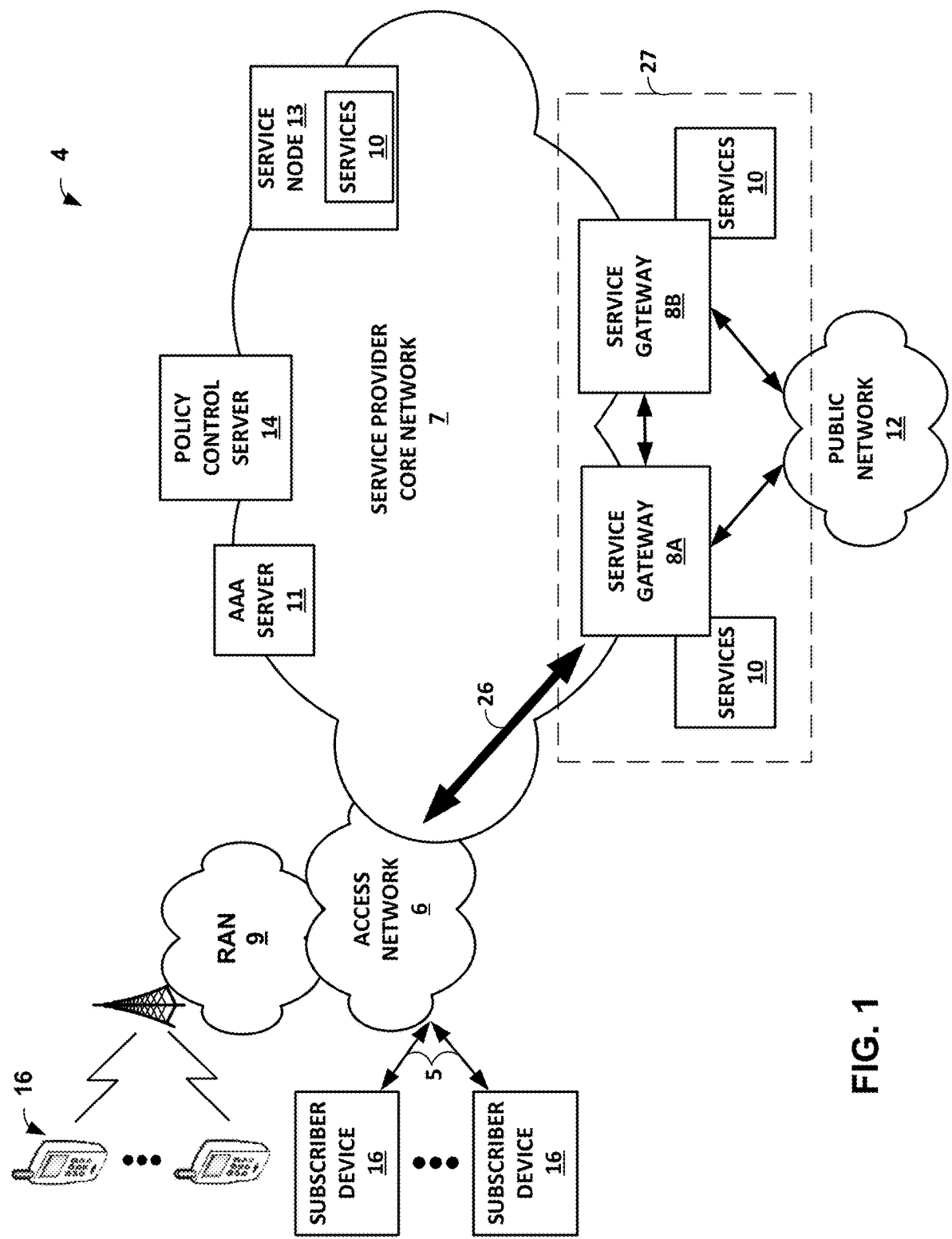
FIG. 1 is a block diagram illustrating an example redundant service gateway system operating in accordance with techniques described herein.

FIG. 1 is a block diagram illustrating an example redundant service gateway system 4 operating in accordance with techniques described herein. In the example approach shown in FIG. 1, redundant service gateway system 4 includes two or more service gateways (here, gateways 8A and 8B and, collectively, "gateways 8") logically associated as a redundant service delivery system 27 in accordance with one or more aspects of the techniques described in this disclosure in order to provide high availability. In one example approach, redundant service gateway system 4 of FIG. 1 includes a subscriber access network 6 ("access network 6") connected to a service provider core network 7 and, through service provider core network 7, to public network 12. In one example approach, service provider core network 7 operates as a private network to provide packet-based network services to subscriber devices 16A-16N (collectively, "subscriber devices 16") across access network 6. In one such example approach, service provider core network 7 provides authentication and establishment of network access for subscriber devices 16 such that the subscriber device may begin exchanging data packets with public network 12, which may be an internal or external packet-based network such as the Internet.

In the example of FIG. 1, access network 6 provides connectivity to public network 12 via service provider core network 7 and gateways 8. In one example approach, service provider core network 7 and public network 12 provide packet-based services that are available for request and use by subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various example approaches, public network 12 is connected to a public WAN, the Internet, or to other networks. In some such examples, public network 12 executes one or more packet data protocols (PDPs), such as IP (IPv4 and/or IPv6), X.25 or Point-to-Point Protocol (PPP), to enable packet-based transport of public network 12 services.

As shown in the example of FIG. 1, each of the service gateways 8 provide a set of services 10. In some example approaches, gateways 8 provide these services via a service plane within each of gateways 8. Subscriber devices 16 connect to gateways 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of redundant service gateway system 2 via radio access network (RAN) 9. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. In some example approaches, subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

In some example approaches, a network service provider operates, or in some cases leases, elements of access network 6 to provide packet transport between subscriber devices 16 and gateways 8. Access network 6 represents a network that aggregates data traffic from one or more subscriber devices 16 for transport to/from service provider core network 7 of the service provider. In some example approaches, access network 6 includes network nodes that execute communication protocols to transport control and user data to facilitate communication between subscriber devices 16 and gateways 8. Access network 6 may include a broadband access network, network, a wireless LAN, a public switched telephone network (PSTN), or other type of access network, and may include or otherwise provide connectivity for cellular access networks, such as radio access network (RAN) 9 of FIG. 1. Examples of radio access network 9 include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), 3rd Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing public network 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of service gateway system 4 that include a wireline/broadband access network such as subscriber access network 6, each of gateways 8 may represent a Broadband Network Gateway (BNG), a Broadband Remote Access Server (BRAS), MPLS Provider Edge (PE) router, core router or gateway, or a Cable Modem Termination System (CMTS), for instance. In examples of service gateway system 4 that include a cellular access network such as subscriber access network 6, each of gateways 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to each gateway 8 may be implemented in a switch, service card or other network element or component.

A network service provider administers at least parts of service gateway system 4, typically offering services to subscribers associated with devices, e.g., subscriber devices 16, that access service gateway system 4. Services offered may include, for example, traditional Internet access, Voice-over-Internet Protocol (VoIP), video and multimedia services, and security services. As described above with respect to access network 6, service provider core network 7 may support multiple types of access network 6 infrastructures that connect to service provider network access gateways to provide access to the offered services. In some instances, a service gateway system 4 may include subscriber devices 16 that attach to multiple different access networks 6 having varying architectures.

In general, applications executing on one or more of subscriber devices 16 may request authorization and data services by sending a session request to one or more of service gateways 8. In turn, service gateways 8 typically access an Authentication, Authorization and Accounting (AAA) server 11 to authenticate the subscriber device requesting network access. In some examples, service gateways 8 query policy control server 14 and/or AAA server 11 to determine subscriber-specific service requirements for packet flows from subscriber devices 16.

Once authenticated, any of subscriber devices 16 may send subscriber data traffic toward service provider core network 7 in order to access and receive services provided by public network 12. Such packets traverse service gateways 8 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by, for example, the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider core network 7 and establishing a communication session for receiving data services. Path 26 illustrates routing of data from subscriber devices to public network 12 and back as defined by one or more gateways 8.

As described herein, service gateways 8 provide services 10 to some or all of the network traffic. As examples, services 10 in one or more gateways 8 may apply firewall and security services, network address translation (NAT) or carrier grade network address translation (CG-NAT), media optimization (voice/video), IPSec/VPN services, deep packet inspection (DPI), session border controller (SBC), virtual appliance, virtual cache, network traffic acceleration, Quality of Service (QoS), access control, hyper-text transfer protocol (HTTP) filtering, counting, accounting, charging, and load balancing of packet flows or other types of services applied to network traffic. In some examples, services provided by service gateways 8 may be composite services composed of two or more services, and may form a single externally visible service to subscribers 16. As one example, services 10 may be a composite service consisting of NAT services and firewall services.

In some examples, each of services 10 may run as virtual machines in a virtual compute environment provided by service gateways 8 or within other execution environments. For example, although described herein as provided by compute blades within service gateways 8, the compute environment for services 10 may instead, or in addition, be provided by a scalable cluster of general computing devices, such as x86 processor-based servers. As another example, services 10 may reside on a combination of general-purpose computing devices and special purpose appliances. Service 10 may also be virtualized, individual network services that scale as in a modern data center, through the allocation of virtualized memory, processor utilization, storage and network policies, as well as by adding additional load-balanced virtual machines.

In one example approach, gateways 8 steer individual subscriber packet flows through defined sets of services provided by services 10. That is, each subscriber packet flow may be forwarded through a particular ordered combination of services provided by services 10 within particular gateways 8, each ordered set being referred to herein as a "service chain." Moreover, a given service chain may include network services provided "on box" within service deliver gateways 8 or "off box" by a separate computing environment accessed by the gateways 8, or by combinations thereof. In this way, subscriber flows may be processed by gateways 8 as the packets flow between access network 6 and public network 12 according to service chains configured by the service provider. Some techniques for accomplishing this are described in U.S. patent application Ser. No. 14/042,685, entitled "Session-Aware Service Chaining Within Computer Networks," filed Sep. 30, 2013, the descriptions of which are incorporated herein by reference.

Once processed at a terminal node of the service chain, i.e., the last service applied to packets flowing along a particular service path, the terminal node may direct the traffic back to the forwarding plane of gateway 8 for further processing and/or for forwarding to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. Gateways 8, after authenticating and establishing access sessions for the subscribers, may determine that a profile of each subscriber device 16 requires the traffic to be sent on a service tunnel to one or more service nodes 13 for application of services, and directs packet flows for the subscribers along the appropriate service tunnels within each gateway 8, thereby causing services 10 (e.g., service nodes 13 that provide the services) to apply the requisite ordered services for the given subscriber.

Services 10 may, for instance, represent one or more service nodes that implement service chains using internally configured forwarding state that directs packets of the packet flow along the service chains for processing according to the identified set of services 10. Such forwarding state may specify tunnel interfaces for tunneling between services 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect services 10 may be configured to direct packet flow to services 10 according to the service chains.

As noted above, redundancy in devices or controllers that extend across two or more chassis provides enhanced reliability. Current inter-chassis redundancy solutions, however, are geared toward providing redundancy across two homogeneous chassis within the same network. A typical network, however, is not a collection of homogeneous chassis. To compensate, as described herein, service gateways 8 may provide user interfaces programmed to support semantics and commands that allow a user to more efficiently define and administer active-active or active-standby redundancy with respect to services 10 applied to packet flows within service gateway system 4. In one example approach, the user interface allows an administrator or network management system to easily specify configuration data defining redundancy mechanisms for administering a cluster of redundant service gateways. The techniques described herein decouple application-layer redundancy mechanisms from underlying communication mechanisms between the devices, thereby allowing protocols, such as routing protocols and inter-chassis communication protocols, to easily be leveraged by the abstracted redundancy mechanisms. The techniques of this disclosure can also allow an administrator to easily configure redundancy arrangements on gateways 8 on a per-service and/or per composite service level of granularity.

Moreover, the techniques of this disclosure provide a management interface expressivity, i.e., a syntax, that leverages an abstraction that can be used across different types of gateways to hide the underlying hardware. This management interface expressivity may be more useful for system administrators, and may also drive the behavior of service provider core network 7 and service gateways 8 more efficiently.

In this way, in one example, the framework provided by the techniques may easily be used to define user interface constructions that leverage routing protocols for facilitating redundancy-related actions, such as causing network devices of service provider core network 7 to redirect traffic from one of service gateways 8 to the other. For example, as described herein, the user interface constructs may be defined to configure the application layer services to easily add or remove so-called "signal-routes" to trigger actions related to the redundancy mechanisms, such as groups of redundant devices or routing/switching instances. In one example approach, a signal-route is a route used by applications using the services redundancy process described below to signal changes in application mastership state and drive routing-policy changes at the same time. In one such example approach, "signal-routes" are static routes manipulated by the service gateway to affect the routing-policies in order to switch mastership between redundant service gateways and to redirect traffic to the new master service gateway.

In one example, the techniques described herein provide user interface (UI) building blocks that allow the user to define and specify logical constructs for a redundant service delivery system, such as redundant service delivery system 27 of FIG. 1. The UI building blocks include a support for a syntax allowing a user to define critical events that trigger a switch from gateway mastership to a standby state ("Redundancy Events"). In one example approach, a Redundancy Event (RE) is an event that triggers a services redundancy (SR) daemon to switch gateway mastership from one service gateway 8 to another. For example, the user may define a redundancy event in terms of a degradation of performance of the service 10 such that a service node can no longer provide the services paid for by a service level agreement (SLA) associated with one of subscriber devices 16.

In one example approach, the UI building blocks include support for a syntax allowing a user to define a policy ("Redundancy Policy (RP)") that defines how redundancy events are tied to actions to be taken on the occurrence of the 1 events defined by the redundancy events. In some such approaches, a redundancy policy is a policy that details the actions to be taken on the occurrence of one or more of the underlying critical events. In some examples, the actions may specify that a service redundancy process of service gateway 8A updates routing information maintained by the service gateway 8A, prompting a routing protocol executing on service gateway 8A to issue a routing protocol update to routing peers (not shown) within service provider core network 7.

In one example approach, the UI building blocks include support for a syntax allowing a user to group one or more redundancy policies into a set, termed a "Redundancy Set (RS)," and a syntax allowing a user to group one or more redundancy sets into a group of sets, termed a "Redundancy Group (RG)." In this manner, service gateways 8 include respective user interfaces that support a syntax that allows a user to define one or more redundancy events, redundancy policies, redundancy sets, and redundancy groups, as explained in further detail below. The ability to create redundancy sets and redundancy groups can allow for defining multiple redundancy groups across the same set of service gateway chassis, for example.

In accordance with the techniques of this disclosure, a services redundancy process of each of service gateways 8 monitors performance levels of services 10. In the event that the monitor component detects a failure or degeneration of pre-set service levels for any of services 10 that meets the definition of a redundancy event, the services redundancy process triggers application of a pre-defined redundancy policy. In some aspects, for example, the services redundancy process may interact with services 10 to collect statistics, perform handshaking, or carry out other checks to the functionality of services 10.

The performance level of the services 10 are independent of an overall operational state of the service gateway network devices 8. In other words, upon detecting a configured redundancy event, the service gateway 8 is able to trigger redundancy-related actions for the service 10. This may include, for example, changing primary/standby roles associated with a redundancy set or redundancy group from service gateway 8A to service gateway 8B, for example, even though service gateway 8A and/or the existing service node used for application of the affected service 10 remains operable. The switchover of network traffic requiring the services 10 occurs without disruption to a subscriber 16 receiving the services 10.

Figure 2:
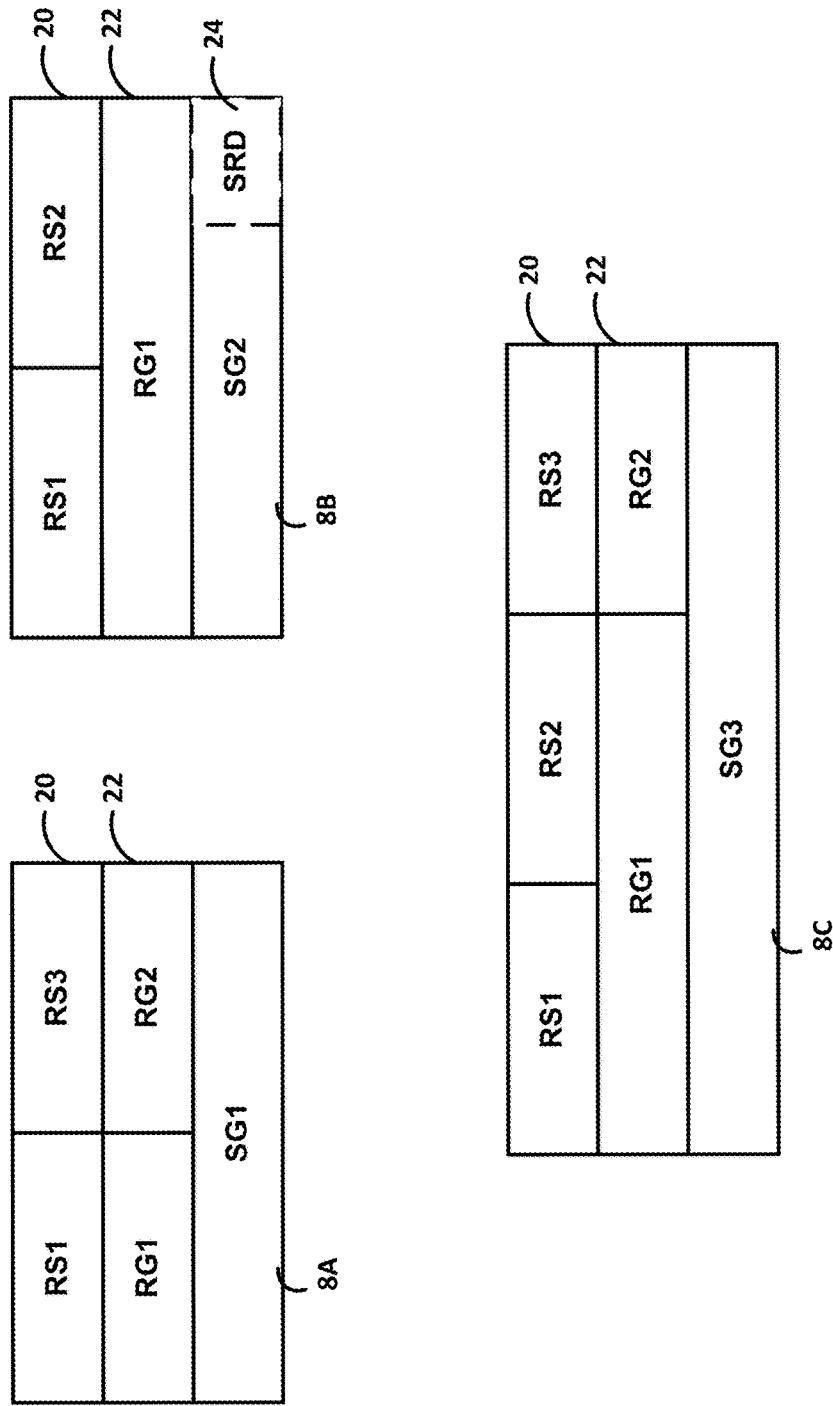
FIG. 2 illustrates redundancy groups and redundancy sets on service gateways.

FIG. 2 is a block diagram illustrating example redundancy groups and redundancy sets that may be defined on service gateways 8 using the syntax supported by the user interface as described herein. In the example shown in FIG. 2, service gateways 8A, 8B and 8C are connected in a redundant service delivery system 27 controlled by one or more service redundancy (SR) daemons 24. UI building blocks are used to define events (Redundancy Events), to define a redundancy policy for reacting to such events (Redundancy Policies), and to group the redundancy policies into sets (Redundancy Sets). The redundancy policies detail the action to take on the occurrence of the defined redundancy event.

In one example approach, a redundancy set not only groups one or more redundancy policies into a set, but also assigns states to that set. In one such approach, each redundancy set includes a master state and at least one standby state; the UI building blocks include a technique for defining the critical events that lead to a change in state. In one example approach, each redundancy set therefore establishes the granularity of conditions that drive changes in master/standby states as a function of redundancy policies and their underlying redundancy events. In one example approach, a redundancy set also binds one or more service-sets to drive the Stateful Synchronization state related to these service sets, in which state is synchronized across service gateways based on the redundancy sets for potential failover of redundancy sets.

As noted above, in one example approach, the UI building blocks described herein include a technique for grouping two or more redundancy sets into a "Redundancy Group (RG)." In one such example approach, a redundancy group 22 is a collection of one or more redundancy sets 20; redundancy groups are defined for each service gateway 8. In the example shown in FIG. 2, redundant service delivery system 27 includes three application aware redundancy sets 20 (RS1-RS3) across three redundancy groups 22 (RG1-RG3) distributed between three service gateways 8 (SG1-SG3). In the example shown in FIG. 2, service gateway 8A (SG1) includes two redundancy groups 22, RG1 and RG2. RG1 of SG1 includes a single redundancy group 22 (RS1), while RG1 of SG3 includes RS1 and RS2.

The UI framework defined herein provides the ability to extend service redundancy across chassis for different groups, events and actions. The framework allows administrators to define custom events that can be used as triggers for switchovers and custom redundancy polices that include actions to be taken for the switchovers. The chassis that make up the redundancy groups can be homogeneous or heterogeneous chassis, can be connected over L2 or L3 networks, and can be geographically separated.

Figure 3:
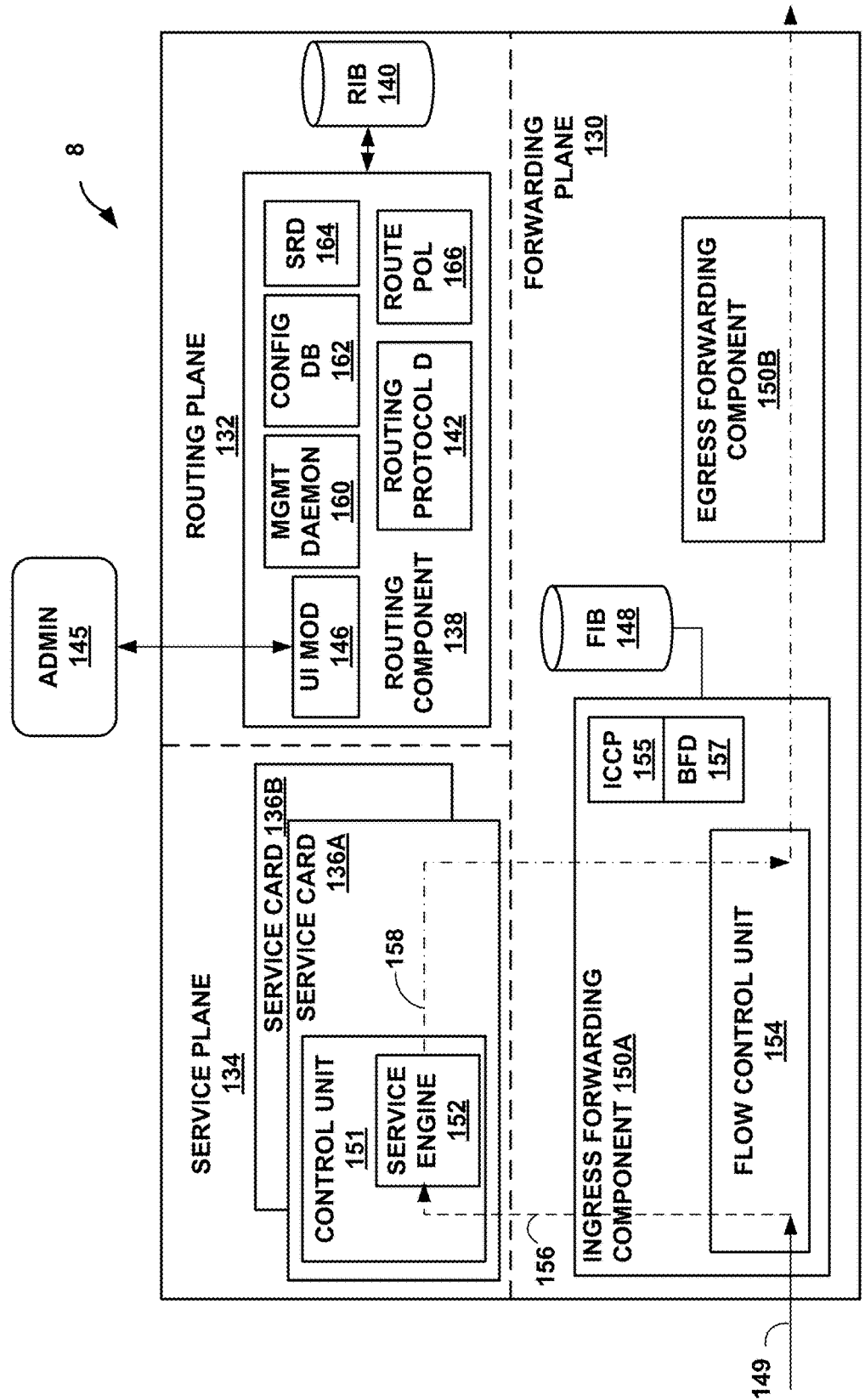
FIG. 3 is a block diagram illustrating an example service gateway in accordance with the techniques described in this disclosure.

FIG. 3 is a block diagram illustrating an example service gateway network device in accordance with the techniques described in this disclosure. In the example of FIG. 3, the service gateway network device (service gateway 8) includes a forwarding plane 130, a routing plane 132 and a service plane 134. Forwarding plane 130 may be provided by dedicated forwarding integrated circuits normally associated with high-end routing and forwarding components of a network router. U.S. Pat. No. 8,050,559, issued Nov. 1, 2011 and entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router, the descriptions of which are incorporated herein by reference.

Service gateway 8 may integrate a routing plane 132 and a service plane 134 in a manner that utilizes shared forwarding plane 130. Forwarding plane 130 may represent a rich and dynamic shared forwarding plane, in some cases distributed over a multi-chassis router. Moreover, forwarding plane 130 may be, as noted above, provided by dedicated forwarding integrated circuits normally associated with high-end routing components of a network router such that routing plane 132 and forwarding plane 130 operate as a high-end router. In one example approach, service plane 134 may be tightly integrated within service gateway 8 (e.g., by way of service cards 136) so as to use forwarding plane 130 of the routing components in a shared, cooperative manner. Details of such routing can be found in U.S. Pat. No. 8,339,959, issued Dec. 25, 2012 and entitled "STREAMLINED PACKET FORWARDING USING DYNAMIC FILTERS FOR ROUTING AND SECURITY IN A SHARED FORWARDING PLANE," the descriptions of which are incorporated herein by reference.

As seen in FIG. 3, routing plane 132 provides a routing component 138 that is primarily responsible for maintaining a routing information base (RIB) 140 to reflect the current topology of a network and other network entities to which service gateway 8 is connected. For example, routing component 138 provides an operating environment for execution of routing protocols by a routing protocol process such as routing protocol daemon 142 (RPd). Example protocols include routing and label switching protocols, such as a border gateway protocol (BGP), Open Shortest Path First (OSPF), intermediate-systems to intermediate-system (ISIS) routing protocol, a resource reservation protocol (RSVP), RSVP with traffic engineering extensions (RSVP-TE), an interior gateway protocol (IGP), link state protocols, and a label distribution protocol (LDP). Routing protocol daemon 142 may represent a software component or module that communicates with peer routers and periodically updates RIB 140 to accurately reflect the topology of the network and the other network entities. While described as a daemon or software module executed by routing engine 44, routing daemon 61 may be implemented as a hardware module or as a combination of both hardware and software.

Routing component 138 may receive this routing information via routing protocol daemon 142 and update or otherwise maintain RIB 140 to reflect a current topology of core network 7. This topology may provide for multiple different paths through core network 7 to reach any given subscriber device 16. In the example of FIG. 1, a path exists from public network 12 through each of service gateways 8 to subscriber devices 16. Routing component 138 in one of the gateways 8 may, in some instances, select the path to use to connect a subscriber device 16 to public network 12.

In the example shown in FIG. 3, admin 145 may interface with routing component 138 via a user interface (UI) module 146, which may represent a module by which a user or provisioning system may interface with routing component 138. UI module 146 may, for example, include a command line interface (CLI), which may accept inputs in the form of commands and/or scripts, or may include a graphical user interface (GUI). Admin 145 may interface with UI module 146 to configure various components service gateway 8, including routing component 138. Once configured, routing component 138 may then resolve RIB 140 to generate forwarding information. Routing component 138 may then interface with forwarding plane 130 to install this forwarding information into a forwarding information base (FIB) 148.

Ingress forwarding component 150A and egress forwarding component 150B ("forwarding components 150") may represent software and/or hardware components, such as one or more interface cards (not shown), that forward network traffic. In one example approach, forwarding component 150A maintains FIB 148 that associates network destinations with specific next hops and corresponding interface ports of output interface cards of service gateway 8. In some such example approaches, routing component 138 generates FIB 148 in the form of a radix tree having leaf nodes that represent destinations within network 7. U.S. Pat. No. 7,184,437, issued Feb. 27, 2007, provides details on exemplary example approaches of a router that utilizes a radix tree for route resolution, the descriptions of which are incorporated herein by reference.

In one such example approach, when forwarding a packet, forwarding component 150A traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

As seen in FIG. 3, service plane 134 represents a logical or physical plane that provides one or more services using service cards 136. Service cards 136A and 136B (collectively "service cards 136") may represent physical cards that are configured to be inserted into service gateway 8 and coupled to forwarding plane 130 and routing plane 132 via a backplane, switch fabric or other communication medium. Typically, service cards 136 may comprise cards that couple directly to the switch fabric. Service cards 136 may be removable from service gateway 8. Admin 145 may interface with UI module 146 to interface with routing component 138 to specify which packet flows are to undergo service processing by one or more of service cards 136. After specifying these flows, routing component 138 may update RIB 140 to reflect that these flows are to undergo service processing, such that when resolving FIB 148, the forwarding information may indicate that various flows are to undergo service processing. Often, this forwarding information may specify that these flows require service processing by specifying a next hop for these flows that directs packets of these flows to one of service cards 136 (where this next hop may be referred to as an "internal next hop"), as described in further detail below. Additional next hops may be specified that are external to service gateway 8, where the external next hop may specify, in this example, on which path the packet is to be forwarded. The internal next hop may be linked to the external next hop, where in this example, service gateway 8 may maintain two next hops (and possibly more) for any given flow.

Service cards 136 may each represent a card capable of applying one or more services. Service card 136 may include a control unit 151, which may represent one or more general processors that execute software instructions, such as those used to define a software or computer program, stored to a non-transitory computer-readable medium such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, control unit 151 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. In some instances, control unit 151 may be referred to as a processor.

Control unit 151 may implement a service engine 152, which may represent a module or unit that applies one or more services to packets, flows of packets and/or sessions of packets (where a session refers to the combination of a flow to a destination from a source and a flow from the same destination to the same source). Service engine 152 may be a software and/or hardware component that applies services in accordance with service policy rules defined by policy configuration data stored by service policies (not shown). The service policies may be configured by administrator 145 via UI module 146, and programmed by management daemon 160, for example. Service engine 152 may perform any type of service, including those listed above and below. For purposes of illustration, it is assumed that service engine 152 implements a service that modifies, edits or updates information in packets that is generally used in performing path selection or otherwise making forwarding decisions. Example services that modify, edit or updates this information may comprise a NAT service and a tunneling service.

In the example of FIG. 3, forwarding component 150A receives a packet 149 and, acting as an ingress forwarding component, invokes a flow control unit 154. Flow control unit 154 represents a module that selectively directs packets to service plane 134 for processing. In some example approaches, service-plane 134 is a virtual machine. Flow control unit 154 may access FIB 148 to determine whether packet 149 is to be sent to an internal next hop, e.g., one of service cards 136 of service plane 134, or to an external next hop via another one of forwarding components that acts as an egress forwarding component for the flow to which packet 149 corresponds, such as, e.g., egress forwarding component 150B. While referred to as ingress forwarding component 150A and egress forwarding component 150B, each of forwarding components 150A, 150B may be the same or similar to one another in terms of underlying hardware and/or logic. That is, the ingress and egress designation of forwarding components 150A, 150B is merely to denote that forwarding component 150A acts as the ingress forwarding component for the packet flow to which packet 149 corresponds and forwarding component 150B acts as the egress forwarding component for the packet flow to which packet 149 corresponds. Moreover, forwarding plane 130 may include more than two forwarding components, where these additional forwarding components are not shown in the example of FIG. 3 for ease of illustration purposes.

In any event, flow control unit 154 may determine that packet 149 is to be transmitted to service card 136. In response to determining that packet 149 is to be transmitted to service card 136 so that service card 136 can apply a service to packet 149, in some examples flow control unit 154 of ingress forwarding component 150A may append an internal service packet header (which may also be referred to as a "service cookie"). Flow control unit 154 may specify this internal service packet header to include a field that stores an ingress identifier that identifies forwarding component 150A. Flow control unit 154 may append this internal service packet header to packet 149 to generate an updated packet 156. Flow control unit 154 may then direct packet 156 to service card 136 of service plane 134. Service card 136 may receive this packet remove the internal service packet header, parsing the ingress identifier from the internal service packet header. Control unit 151 of service card 136 may then invoke service engine 152, which applies the service to updated packet 156, generating a serviced packet 158. Serviced packet 158 is assumed to differ from packet 149 and 156 in that at least one aspect of serviced packet 158 used when making forwarding decisions or performing path selection differs that of packets 149 and 156 (such as at least one aspect of the five-tuple of serviced packet 158 differs from the five-tuple of packet 149 and packet 156). In this respect, service card 136 applies the service to updated packet 156 to generate serviced packet 158 such that five tuple of serviced packet 158 is different from the five-tuple of updated packet 156.

Service card 136 may then transmit serviced packet 158 back to flow control unit 154 using the ingress identifier previously parsed from the internal service packet header so as to maintain load balancing of packet flows across forwarding components of service gateway 8. That is, service card 136 may actively identify the one of forwarding components 150A, 150B (and any other forwarding components not shown in the example of FIG. 3 for ease of illustration purposes) that originally received packet 149, that acts as the so-called ingress forwarding component, and/or that maintains the single point of contact for the flow to which packet 149 corresponds. As a result, service card 136 transmits serviced packet 158 to ingress forwarding component 150A identified by the ingress identifier without applying a hash function to at least a portion of serviced packet 158 to identify ingress forwarding component 150A and/or without determining a next hop of the to which to forward serviced packet 158. Moreover, service card 136 transmits serviced packet 158 to ingress forwarding component 150A such that ingress forwarding component 150A receives the packet as if the packet had been received by ingress forwarding component 150A via an interface (not shown in the example of FIG. 3) associated with ingress forwarding component 150A that couples to another network device rather than via a switch fabric coupling service card 136 to ingress forwarding component 150A. By selecting ingress forwarding component 150A, service card 136 maintains the load balancing of packet flows across the links/forwarding components (of the receiving router) decided by the upstream router in accordance with weighted equal cost multi-path (WECMP).

Flow control unit 154 receives this serviced packet 158 and accesses FIB 148 using the five-tuple of serviced packet 158 in order to retrieve an entry specifying a next hop for the flow to which serviced packet 158 corresponds. In other words, flow control unit 154 determines the next hop to which to forward serviced packet 158 based on the five-tuple of serviced packet 158. Assuming flow control unit 154 identifies a next hop that involves forwarding serviced packet 158 via an interface associated with egress forwarding component 150B, flow control unit 154 forwards this packet 158 to egress forwarding component 150B, which in turn forwards packet 158 to the next hop.

As can be seen in FIG. 3, routing plane 132 includes a management daemon 160 coupled to user interface module 146 and to a configuration database 162. Management daemon 160 receives configuration information from user interface module 146 and stores the configuration information in configuration database 162. In some examples, routing plane 132 also includes a services redundancy daemon (SRd) 164 (also referred to herein as a services redundancy process), which operates in conjunction with route policies database 166 to configure and control redundant services delivery system 27. SRd 164 also interfaces with service plane 134, such as to permit configuration of service cards 136A, 136B by management daemon 160. SRd 164 may represent a software module that updates RIB 140 based on configuration database 162 and route policies database 166. While described as a daemon, software process, or software module executed by routing component 138, SRd 164 may be implemented as a hardware module or a combination of both hardware and software.

User interface module 146 may represent a software and/or hardware module that presents an interface with which an administrator or an administrative device, represented by "ADMIN" 145, may interact to specify certain operational characteristics of services redundancy gateway network device 8. In response to invocation by admin 145, user interface module 146 interacts with other components of services redundancy gateway network device 8, such as to retrieve, configure, copy, and/or delete policy configuration data stored in route policies database 166, update service data of services plane 143 via SRd 164, and to perform other management-related functions. In one example approach, admin 145 may interact with user interface module 146 to enter configuration information for SRd 164, such as configuration information defining redundancy events, redundancy policies, redundancy sets and redundancy groups, and this configuration information is also stored in configuration database 162.

Redundancy sets will be discussed next. In one example approach, each redundancy set 30 includes a master state and one or more standby states. States get elected based, e.g., on the health of applications. During operation of service deliver gateway 8, one or more services redundancy processes (such as service redundancy daemons 164) in each service gateway 8 may continuously monitor the health-status of the groups of applications and exchange this information across all the related chassis. For example, SRD 164 may detect a failure or degradation in an application (e.g., a service provided by a service engine 152 of service card 136A, such as a firewall service), and may notify Inter-Chassis Control Protocol (ICCP) module 155, which sends information about the affected application to a respective counterpart ICCP module executing on one or more other chassis.

SRd 164 may monitor performance of one or more of service engines 152 in service plane 134. Service plane 46 may provide an operating environment for running one or more applications. In some aspects, service engines 152 may each expose an application programming interface (API) by which SRd 164 inspects performance data (e.g., loading levels) for the respective service. Alternatively, SRd 164 may expose a universal interface, which each of service engines 152 may invoke to communicate current performance data. As another example, SRd 164 may periodically ping each service engine 152 or may monitor output communications from each of the services or operating-system level resources consumed by each of the services of service cards 136A, 136B. In some examples, SRd 164 can monitor any of a variety of parameters associated with service engines 152, which may be defined via a management plane of services delivery gateway network device 8, e.g., via user interface module 146 and management daemon 160. SRd 164 can monitor parameters associated with service engines 152 such as per-process central processing unit (CPU) usage, memory usage, rate of output, number of available connections, or any other parameters for detecting whether a service 52 is performing according to expected levels. For example, if a service 52 is expected to provide an output at a threshold rate, SRd 164 can detect when the actual rate of output falls below the threshold rate. An administrator 145 can configure the performance level thresholds via user interface module 146, such as when an application or other service is initially deployed on services delivery gateway network device 8. The performance level thresholds may be stored in configuration database 162. The performance level thresholds may be selected relative to SLA requirements, to trigger action when performance levels fall below what is required by subscribers 16, for example.

SRD 164 may also continuously monitor for system events of gateway 8, such as interface down events, physical interface card (PIC) reboots, flexible PIC concentrator (FPC) reboots, RPD aborts/restarts, and peer gateway events. For example, SRd 164 may communicate with Bidirectional Forwarding Detection (BFD) module 157 and/or ICCP module 155 in forwarding plane 130 to obtain information by which to detect occurrence of system events.

On detecting the occurrence of redundancy events including application-related events or critical system events, depending on its mastership state, in some example approaches, SRD 164 communicates with the network layer in a protocol agnostic manner to redirect traffic to the next standby node that gets elected as the master. For example, in response to SRD 164 detecting a redundancy event and in accordance with route policies database 166 previously defined by administrator 145, SRD 164 may update signal-routes in RIB 140, which in turn triggers one or more routing protocols executed by routing protocol daemon 142 to advertise the updated signal-routes to routing protocol peer network devices, thereby causing network devices to route traffic differently and send network traffic requiring the affected services to a different services delivery gateway network device. Also, in response to SRD 164 detecting the redundancy event, SRD 164 accordingly updates data specifying Stateful Sync roles, which may be stored in the service plane 134, for example. Stateful sync refers to session-level redundancy state maintained by on the service cards 136A, 136B of gateway 8 according to the stateful sync roles, which allows for synchronization of the necessary session-level state across master and standby service cards for a seamless transition from master to standby. This process is termed a switchover and ensures uninterrupted application services for the end user. By virtue of the message exchanges across all the members of a group, the techniques of this disclosure allow for continuous, fully-automated application switchovers across the chassis.

The user interface described herein also supports a syntax that provides the user the ability to define custom "dummy" redundancy events that can be used to manually pause switchovers or force switchovers, irrespective of the health status of applications.

As one example, a network address translation (NAT) function provided by one of service engines 152 may support a number of connections. Admin 145 may configure a threshold number of connections below which the NAT service should not fall for an expected performance level, and may use the syntax described herein to define a redundancy event (via UI module 146) that expresses the threshold number of connections. Admin 145 may also use the syntax described herein to define a redundancy policy (via UI module 146) that specifies an action to occur upon detection of the defined redundancy event, such as modifying a signal-route stored in RIB 140 to cause routing protocol daemon 142 to advertise an updated signal-route.

Admin 145 can use the syntax described herein to further define one or more redundancy sets and redundancy groups. Management daemon 160 configures configuration database 162 to store the redundancy event, redundancy policy, redundancy sets, and redundancy groups. SRd 164 may continuously or periodically monitor the number of connections being supported by the NAT service, and SRD 164 detects that the number of connections available by the NAT service falls below the threshold number of connections, the SRd 164 detects occurrence of the redundancy event and applies the redundancy policy to trigger the designation of a new master for providing the NAT service, as described herein.

The techniques described herein decouple the application redundancy decision from the underlying network communication mechanism, using a protocol independent mechanism to communicate with the network layer. It allows for custom events to be triggered to simulate failure events to induce switchovers or switchbacks manually.

Further, as described herein, the techniques provide mechanisms by which applications are able to signal network protocols in a protocol agnostic manner using predesignated routes. The applications may use, for example, a route-signal vector, which is a predesignated set of routes called signal-routes each of which map to mastership and standby states which get updated by the application layer on the occurrence of predefined events such as critical faults and user-initiated transitions.

Figure 4:
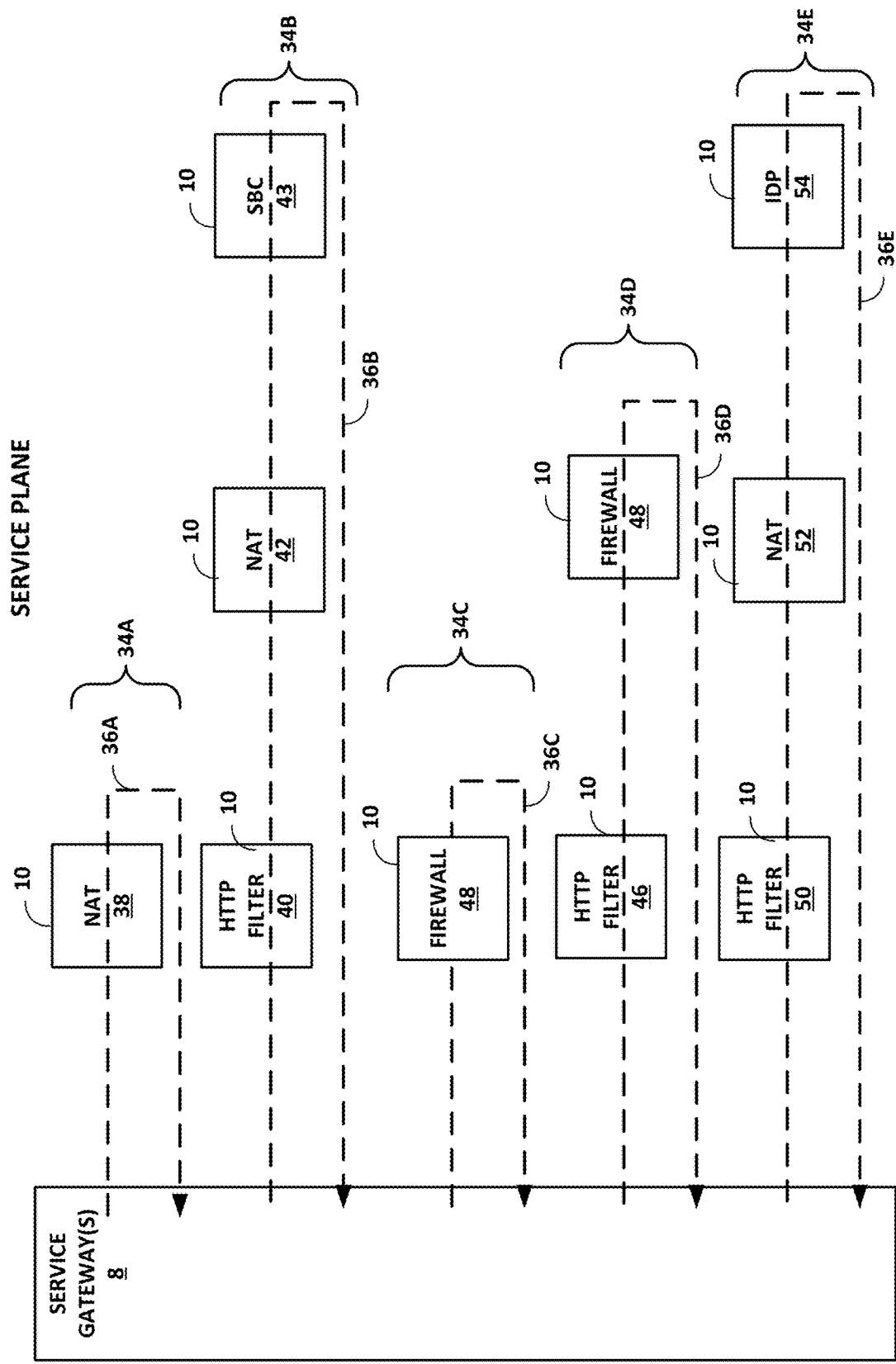
FIG. 4 is a block diagram illustrating an example set of service chains of services according to the techniques described herein.

FIG. 4 is a block diagram illustrating an example set of service chains of services according to the techniques described herein. In one example approach, FIG. 4 illustrates a set of service chains 34A-34E supported by a service gateway 8. Service chains 34 represent an example set of service chains provided by services 10 within, or external to, one or more service gateways 8.

In this example, one or more subscriber packet flows 36A are directed along a first service chain 34A to receive network address translation (NAT) service 38. Similarly, one or more subscriber packet flows 36B are directed along a second service chain 34B for application of an HTTP filter service 40, NAT service 42 and session border controller (SBC) services 43 for voice over IP (VoIP) processing and control. In service chain 34C, packet flows 36C are directed only to firewall service 48. In service chain 34D, packet flows 36D are directed to HTTP filter 46 and subsequently to firewall service 48. As another example, packet flows 36E are directed along service chain 34E for application of HTTP filter 50, NAT 52 and intrusion detection and prevention (IDP) (e.g., deep packet inspection) service 54.

As noted above, current inter-chassis redundancy solutions are geared toward providing redundancy across two or more homogeneous chassis within the same network. The techniques disclosed herein provide a framework for application-aware inter-chassis redundancy with granular control to fail over groups of applications between sets of two or more network elements. The network elements can be homogeneous or heterogeneous (physical or virtual) and can spread across different networks or across geographies. The redundancy mechanism provides traffic redirection agnostic of underlying network protocols and provides options for triggering, preventing and resuming both manual and automated switchovers of groups of services based on their health status; the redundancy mechanism will be discussed further in the context of the discussion of FIG. 5 below.

Figure 5:
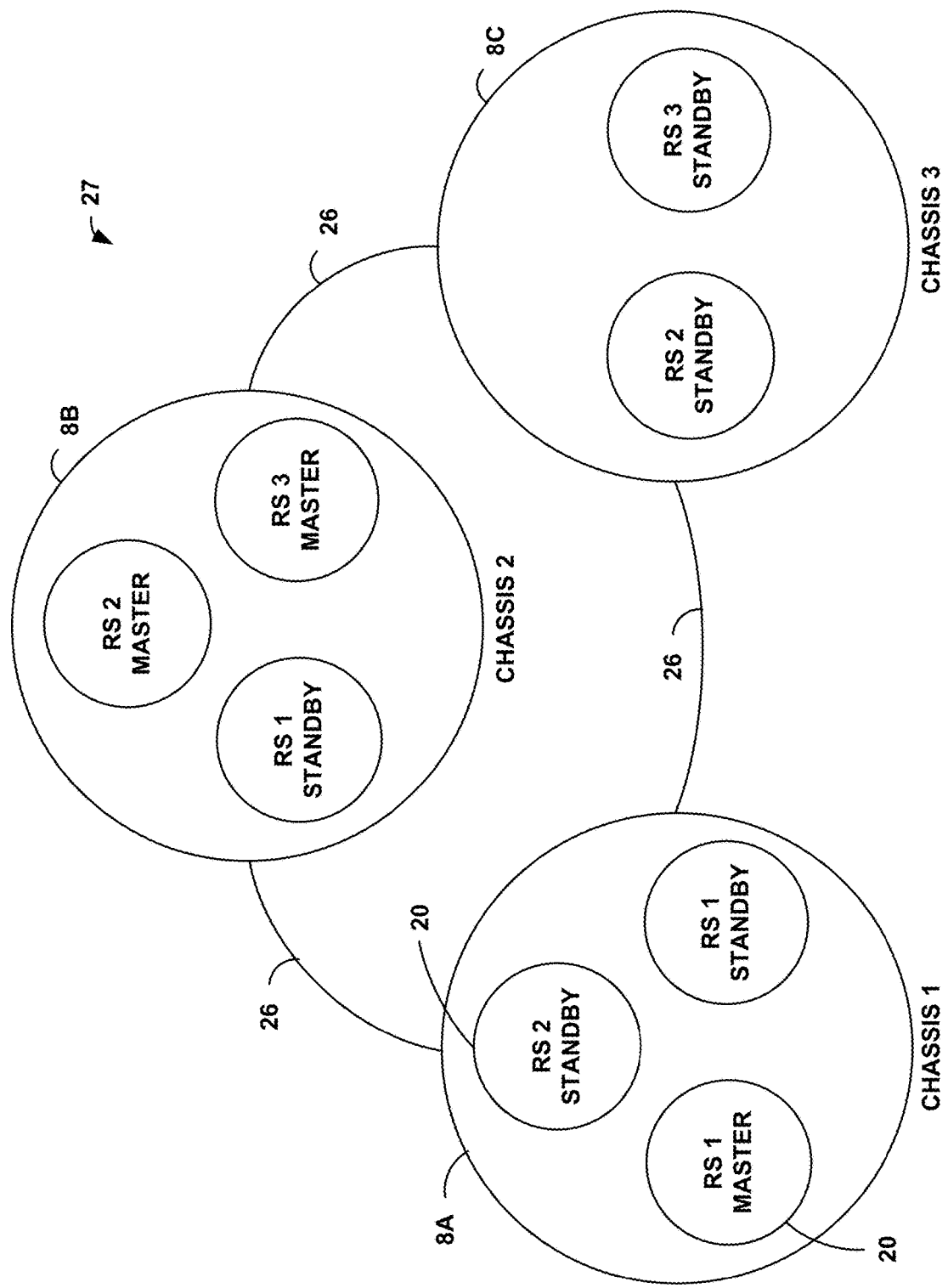
FIG. 5 is a block diagram illustrating master and standby relationships across service gateways.

FIG. 5 is a block diagram illustrating master and standby relationships across service gateways 8 in a redundant service delivery system 27. System 27 shows redundancy sets 20 distributed across gateways 8A-8C. Service gateways 8A-8C are connected via communications channel 26.

Each redundancy set in FIG. 5 is shown in either a Master state or a Standby state. The framework described above establishes a set of building blocks that provides the ability to extend service redundancy across multiple chassis for different groups, events and actions. The framework allows the user to define for each application the custom events that can be used as triggers for switchovers to other chassis and custom redundancy polices that include actions to be taken for the switchovers. The chassis that make up redundancy groups 22 can be homogeneous or heterogeneous chassis, they can be connected over either a L2 or a L3 networks and they can be geographically separated. In some examples, every redundancy set has a master and one or more standbys that get elected based on the health of the application associated with that redundancy set 20.

FIG. 5 also illustrates how two or more service gateways 8 can operate in an "Active-Active" mode by subdividing the services mastership of particular redundancy sets 20 into multiple redundancy groups 22 distributed across the same set of chassis. For instance, referring to FIG. 4, health monitoring for network address translation (NAT) service 38, for intrusion detection and prevention (e.g., deep packet inspection) service 54 and for session border controller (SBC) services 43 may be assigned to redundancy set 3, while health monitoring for HTTP filter service 40 may be assigned to redundancy set 2. Since the mastership for both redundancy set 2 and redundancy set 3 is shown to reside in the chassis for gateway 8B, all the above services are performed by gateway 8B. For this example, NAT service 38 executes on service card 136B of gateway 8B.

If NAT service 38 in gateway 8B were to experience a critical event (such as, e.g., failure of service card 136B), a redundancy event occurs for redundancy set 3, and mastership transitions to gateway 8C as shown in FIG. 5, transferring execution of all the services of redundancy set 3 to gateway 8C. This results in an "Active-Active" subdivision of services between gateways 8B and 8C. In this example, flows such as flows 36B, 36D and 36E will now be routed through both gateways 8B and 8C, while flow 36A may be routed only through gateway 8C and flow 36C remains within gateway 8B.

During operation, a service redundancy daemon 24 executing within each gateway 8 continuously monitors the health-status of groups of applications and exchanges this information across communications channel 26 to all chassis in the redundancy group. Each service redundancy daemon 24 also continuously monitors critical system and application faults. On the occurrence of such faults, depending on its mastership state, service redundancy daemon 24 communicates with the network layer in a protocol agnostic manner to redirect traffic to the next standby node slated to be elected as the master. This process is termed a switchover and it ensures uninterrupted application services for the end user. As detailed above, in one example approach, ICCP provides connectivity between peer redundancy groups 22. Such an approach is shown in more detail in FIG. 6.

Figure 6:
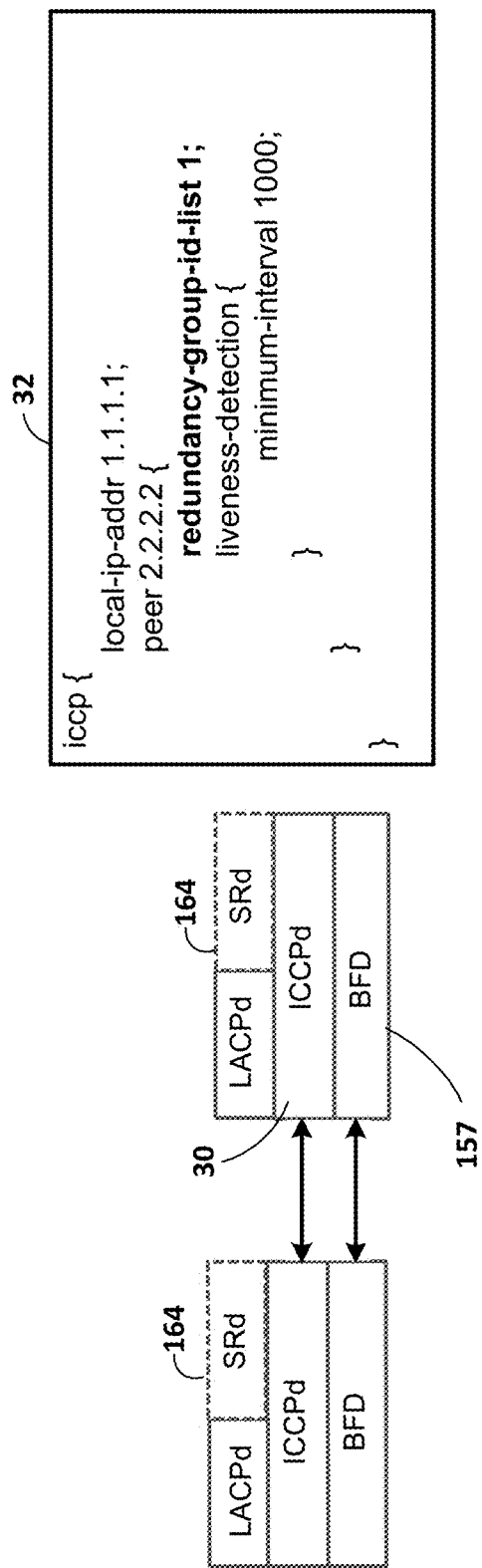
FIG. 6 is a block diagram illustrating communication between gateways in the network system of FIG. 1.

FIG. 6 is a block diagram illustrating communication between gateways in the network system of FIG. 1. In the example shown in FIG. 6, redundancy groups communicate via an Inter-Chassis Control Process (such as an Inter-Chassis Control Protocol daemon (ICCPd) 30). In one such example approach, service redundancy daemon 164 establishes Unix (Interprocess Communication (IPC) with ICCP for transport and notification service across communications channel 26. FIG. 6 also illustrates configuration information 32 used to configure ICCP.

In the example shown in FIG. 6, communications channels 26 between the gateways 8 that make up redundant service delivery system 27 exchange information between the gateways. In some such examples, Inter-Chassis Control Protocol (ICCP) provides connectivity to peer gateways 8. In one approach, ICCP is established as follows:

```
iccp {
   local-ip-addr 1.1.1.1;
   peer 2.2.2.2 {
      redundancy-group-id-list 1;
      liveness-detection {
         minimum-interval 1000;
      }
   }
}
```

In some example approaches, Bidirectional Forwarding Detection (BFD) is used in addition to ICCP to detect failures. BFD 157 provides very fast failure detection in the forwarding plane 130 of gateway device 8. BFD 157 also provides a single mechanism for such detection independent of media, routing protocol and data protocol. In one example approach, BFD 157 executes in the packet forwarding engine of ingress forwarding component 150A. Such an approach ensures that the remote peer is transparent to control plane switchover if, for instance, non-stop forwarding is configured.

By virtue of the message exchanges across all the members of a group, the techniques described herein allow for continuous, fully-automated application switchovers across the chassis. They even provide the user the ability to pause switchovers or force switchovers, overriding the health status of applications. The techniques decouple the application redundancy decision from the underlying network communication mechanism, using a protocol independent mechanism to communicate with the network layer. It allows for custom events to be triggered to simulate failure events to induce switchovers or switchbacks manually.

In one example approach, management daemon 160 presents user interface module 146 by which an administrator 145 ("ADMIN") can enter commands to configure gateway 8 and services engines 152. In some examples, user interface module 146 may be configured to receive text-based commands. According to the techniques of the invention, management daemon 160 supports a command syntax that allows administrator 145 to define redundancy events and routing policies that specify how gateway 8 is to respond to redundancy events. Management daemon 160 may store the configuration input received from administrator 145 as configuration data in configuration database 162, which may take the form of a text file, such as an ASCII file. Alternatively, management daemon 160 may process the configuration input and generate configuration data in any one of a number of forms, such as one or more databases, tables, data structures, or the like. Configuration data may take the form of one or more commands for adding new settings to the current configuration of gateway 8, commands for deleting or modifying existing settings of the current configuration, or combinations thereof. Gateway 8 may further parse configuration data and input from administrator 145, and resolve the references to appropriately configure gateway 8.

Specifically, administrator 145 inputs commands to user interface module 146 to configure routing policies for service redundancy daemon 164, as described in further detail below. Management daemon 160 then stores the routing policies in route policies database 166.

In one example approach, administrator 145 may also input commands to user interface module 146 to configure other aspects of gateway 8. A services daemon in control unit 151 may, for instance, program service cards 136 with configuration data received from the administrator defining firewall zones and policies with respect to physical interfaces, causing the service cards 136 of services engines 152 to recognize the defined zones and applying the security policies when processing packets from data plane flow control unit 154.

As noted above, Redundancy Event (RE) is a critical event that triggers the SR daemon 164 to switch gateway 8 mastership to standby gateway 8. In one example approach, critical events include interface down events, FPC/PIC reboots, Routing Protocol daemon (RPd) aborts or restarts and Peer gateway events. In one example, each gateway 8 is configured via UI module 146 to monitor critical events selected by administrator 145 that cause a service delivery daemon 164 in one gateway 8 to release mastership and that lead a service delivery daemon 164 in another gateway 8 to take up mastership of the redundancy group.

In one example approach, administrator 145 defines a redundancy event RELS_MSHIP_CRIT_EV and lists the critical events that are members of that redundancy event. In one such example, the current configuration of redundancy event RELS_MSHIP_CRIT_EV may be displayed through a show command:

root@SG1# show event-options redundancy-event RELS_MSHIP_CRIT_EV and, in one example approach, the results displayed for redundancy-event RELS_MSHIP_CRIT_EV of gateway 8 are:

```
monitor {
   link-down {
      ae62.3203;
      ams0.100;
      ms-1/0/0;
   }
   process {
      routing {
         restart;
         abort;
      }
   }
}
```

In the above example, a link-down event is triggered when, for instance, an interface down event occurs. A process event occurs when there is a Routing Protocol daemon 142 (RPd) restart. In this example, either the link-down event or the RPd restart event is sufficient to trigger a transfer of gateway mastership away from that gateway 8.

The above are simply examples of critical events. Other critical events may be defined as tied to specific services, or to service chains. For instance, a failure or degradation in a service provided by one or more service cards 136 could serve as a critical event, as could failure or degradation in one of the communication mechanisms available for communicating between gateways 8, or between a gateway 8 and another network device.

As noted above, a Redundancy Policy is a policy that ties a Redundancy Event to one or more actions to be taken on the occurrence of those critical events. In one example, an administrator can request the contents of redundancy policy REL_MSHIP_POL to be displayed through a show command as follows:

root@SG1# show policy-options redundancy-policy RELS_MSHIP_POL and the results are displayed for redundancy-policy RELS_MSHIP_POL of gateway 8 in one example as:

```
redundancy-event [RELS_MSHIP_CRIT_EV RELS_M-
    SHIP_MANUAL_EV];
then {
    release-mastership;
    delete-static-route 10.45.45.0/24 {
        routing-instance SGI-PRIVATE;
    }
}
```

That is, if RELS_MSHIP_CRIT_EV is triggered by specified critical events, or administrator 145 triggers a mastership switch manually using redundant event RELS_MSHIP_MANUAL_EV, mastership is transferred to the highest rated standby gateway 8.

In another example, an administrator can request the contents of redundancy policy ACQU_MSHIP_POL to be displayed through a show command as follows:

root@SG1# show policy-options redundancy-policy ACQU_MSHIP_POL and the results are displayed for redundancy-policy ACQU_MSHIP_POL of gateway 8 in one example as:

```
redundancy-event ACQU_MSHIP_CRIT_EV;
then {
    acquire-mastership;
    add-static-route 10.45.45.0/24 {
        receive;
        routing-instance SGI-PRIVATE;
    }
}
```

In one example approach, an administrator can request the contents of redundancy policy WARN_POL to be displayed through a show command as follows:

root@SG1# show policy-options redundancy-policy ACQU_MSHIP_POL and the results are displayed for redundancy-policy ACQU_MSHIP_POL of gateway 8 in one example as:

```
redundancy-events WARN_EV;
then {
    broadcast-warning;
}
```

One approach for setting up gateway 8 to trigger a mastership change is as follows:

root@SG1> request services redundancy-set id 1 trigger redundancy-event ACQU_MSHIP_MANUAL_EV {force masterhip acquisition} root@SG1> request services redundancy-set id 1 trigger redundancy-event RELS_MSHIP_MANUAL_EV {force mastership release}

As noted above, a redundancy set establishes the granularity of the master/standby states driven by redundancy policies. In one example approach, a redundancy set may also bind one or more service-sets to drive the Stateful Sync state related to the service-sets. In one example, a first redundancy set (redundancy-set) is defined for a gateway 8 and can be displayed through a show command as follows:

root@SG1# show services redundancy-set and the results are displayed for one example redundancy set as:

```
traceoptions {
    level all;
    flag all;
}
1 {
    redundancy-group 1;
    redundancy-policy [ACQU_MSHIP_POL_RELS_M-
        SHIP_POL];
    hold-time 10;
}
``` root@SG # show services service-set CGN4_SP-7-0-0

```
replicate-services {
    replication-threshold 360;
    stateful-firewall;
    nat;
}
+redundancy-set 1;
```

A Redundancy Group (RG) is a collection of Redundancy Sets and defines common peering properties across a set of gateways 8. RGs allow for different peering settings across same peers. In one example, a first redundancy group (redundancy-group 1) is defined for a gateway 8 and can be displayed through the same show command as used for the redundancy set, and achieves the same result:

root@SG1# show services redundancy-group and the results are displayed for one example redundancy group 1 as:

```
traceoptions {
    level all;
    flag all;
}
1 {
    redundancy-group 1;
    redundancy-policy [ACQU_MSHIP_POL_RELS_M-
        SHIP_POL];
    hold-time 10;
}
``` where, in some examples, hold-time is a delay taken before implementing the redundancy policy.

Figure 7:
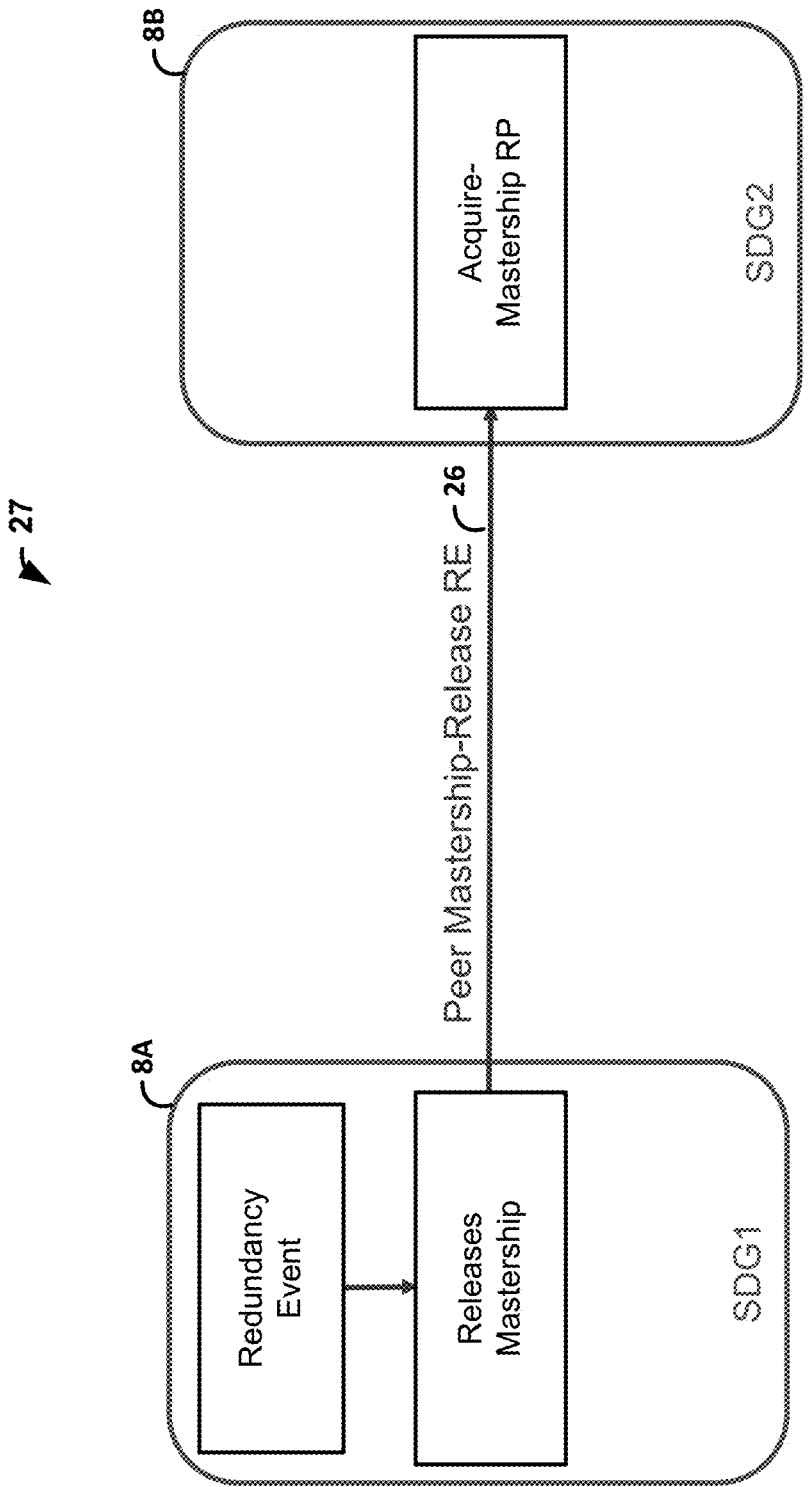
FIG. 7 is a block diagram illustrating a mastership transition to a peer in accordance with techniques described herein.

FIG. 7 is a block diagram illustrating a mastership transition to a peer in accordance with techniques described herein. In some examples, Peer Events are defined as a type of Redundancy Events that are exchanged between SRd peers. Redundancy Policies tied to Peer Events allow a local SRd peer to act based on Peer Events reported by remote SRd peers as shown in FIG. 7. In the example of FIG. 7, a redundancy event occurs on service gateway 8A, and SG1 releases mastership to SG2 executing on service gateway 8B. In one example approach, a message is sent to SFG2 from SG1 via ICCP telling SG2 to take over as master. In one such example, a group of peer events are defined for a gateway 8. In some such examples, the members of the group of critical peer events can be displayed through a show command as follows:

root@SG2# show event-options redundancy-events PEER_MSHIP_RELS_EV and the results are displayed as:

```
monitor {
    peer {
        mastership-release;
    }
}
``` and root@S G2# show event-options redundancy-event PEER_MSHIP_ACQU_EV

```
monitor {
    peer {
        mastership-acquire;
    }
```

```
    }
root@SG2# show event-options redundancy-events WARN_EV
monitor {
    link-down {
        ae62.3203;
        ams0.100;
        ms-1/0/0;
    }
    process {
        routing {
            restart;
            abort;
        }
    }..
```

One potential advantage of the user interface and redundancy framework discussed above may be the ability to provide redundancy for one or more groups of applications across two or more chassis, independent of the underlying network protocols. The framework is highly extensible by the use of the system of redundancy events, redundancy policies, and redundancy groups, making is easy to incorporate new events and actions for supporting network function virtualization (NFV) based use-cases. The redundancy framework may provide for uninterrupted availability of services (termed Non-Stop Services for applications). The redundancy framework also allows a set of two or more chassis function in an 'Active-Active' mode by virtue of sub dividing the services mastership in to multiple redundancy-groups across the same set of chassis. The approach described herein is also routing protocol agnostic, in that the syntax allows the administrator to express the redundancy events and redundancy policies in a way that is independent of the underlying routing protocol that is ultimately used by the router for communicating a change in mastership.

In one example approach, SRd 164 may also be used to synchronize the configuration across all the peers in a redundancy set. Consider the following Carrier Grade Network Address Translation (CGNAT) configuration stanza (tied to a redundancy set, RS #1),

```
service-set SFW6_AMS0 {
    syslog {
        host 1.2.1.1 {
            services any;
            class {
                session-logs;
                stateful-firewall-logs;
                alg-logs;
            }
            source-address 1.2.1.2;
        }
    }
    stateful-firewall-rules SFW6_AMS0-r1;
    next-hop-service {
        inside-service-interface ams0.199;
        outside-service-interface ams0.200;
    }
    redundancy-set-id 1;
}
``` through which SRd 164 can ensure that contents of service-set CGN4_AMS0, which is tied to RS1, are synchronized all the nodes that are a part of RS1.

Any event in a router or gateway can be mapped into a redundancy event and used to trigger a transition in the state of a redundancy set. In one example approach, a generic operating system event (e.g., a generic system JUNOS event) is configured as a redundancy event (RE) as follows:

```
policy EVNTD_TO_SRD_POL {
    events CHASSISD_SNMP_TRAP10;  ← Generic JUNOS event
        attributes-match {
        chassisd_snmp_trap10.trap matches "FRU power off";
    }
    then {
+       trigger-redundancy-event RELS_MSHIP_CRIT_EV ← Converted to
            RE
+       arguments {
+           fru_slot " {$$.value7}";
+       }
    }
}
```

Figures 8A, 8B:
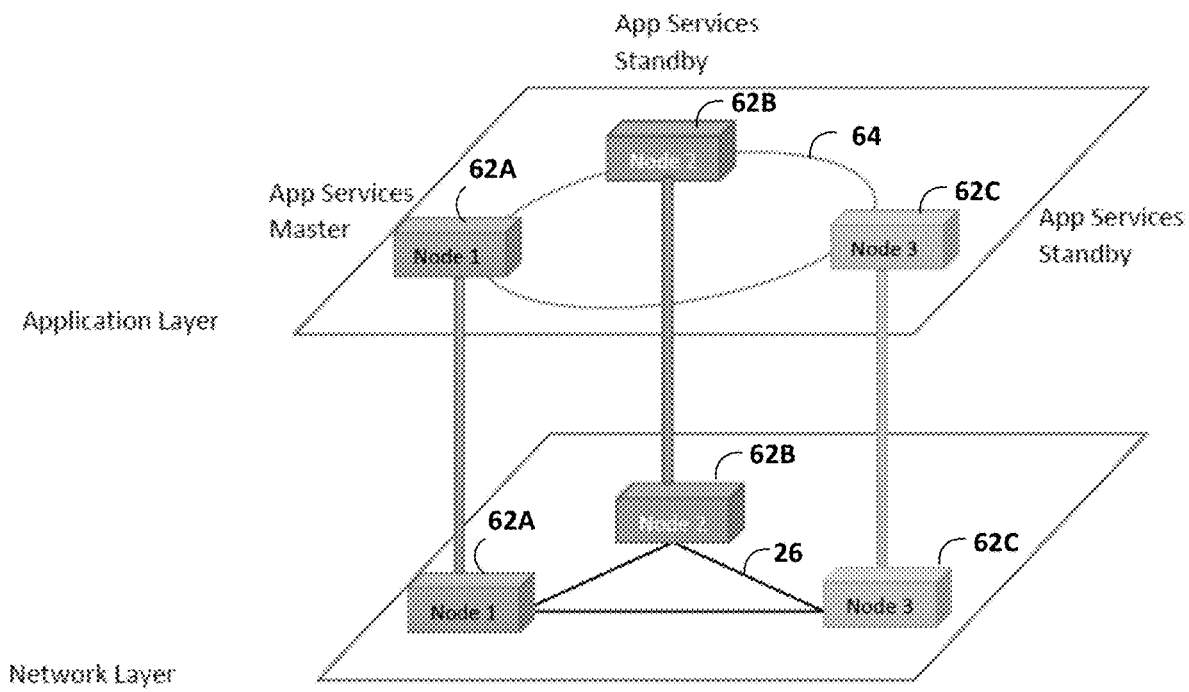
FIG. 8A is a block diagram illustrating communication between application nodes in the redundant service gateway system of FIG. 1.
FIG. 8B is a representative route-signal vector in accordance with techniques described herein.

FIG. 8A is a block diagram illustrating communication between application nodes in the redundant service gateway system of FIG. 1. In the example of FIG. 8A, three network elements (network nodes 60A-60C) communicate through communications channel 26. Application services nodes 62A through 62C are associated with network elements 60A through 60C, respectively, and are arranged in a master/standby relationship. In one example approach, the communication mechanism shown in FIG. 8A and described herein permits communicating in a protocol and network agnostic manner between application nodes in redundant service delivery system 27.

In one example, two or more network elements 36 make our application overlay network of which a single node 62 (here, 62A) is the application (services) master and one or more nodes 62 are standby. Such an application network is said to be resilient when, on the occurrence of a critical fault on the master, the next standby in the hierarchy can automatically take over the mastership, ensuring uninterrupted application services. In one example methodology, application services nodes 62 signal network-protocols in a protocol agnostic manner using predesignated routes.

In one example approach, a route-signal vector 70 is used to store state for each redundancy set. As can be seen in the example shown in FIG. 8B, route-signal vector 70 is a predesignated set of routes called signal-routes each of which map to mastership and standby states. In the example shown in FIG. 8B, route-signal vector 70 includes one or more signal-routes 72 and one or more signal-route states 74 organized as signal-route/signal-route state pairs. In some example approaches, state 74 is a zero when the redundancy set associated with the signal-route 72 is to be in a stand-by state and a one when the signal-route 72 is to be in a master state. In other example approaches, state 74 is a zero when the redundancy set associated with the signal-route 72 is to be in a master state and a one when the signal-route 72 is to be in a stand-by state.

In some approaches, an application executing in the application layer updates the signal-routes on the occurrence of redundancy events such as critical faults. It is not a requirement for the destination represented by the routes that make up the route-signal vector 70 to be reachable since they are used only for signaling between the application and the network layers. Routing-policies, which drive routing-protocols, are coupled to the existence or non-existence of these routes. As soon as the application layer (e.g., SRd 164) adds or removes these signal-routes from RIB 140, the routing policies are implicated, resulting in the next most preferred standby taking application mastership. Standby nodes synchronize state from the master so that anytime the master fails, the next best standby can take over the mastership. An application services node 62 taking over application mastership begins to perform one or more application services such as Mobility services, Stateful firewall, CGNAT, NAT, IDP, proxy services, application acceleration, etc., on the network traffic. The added bonus of this methodology is its ability to ensure resiliency over L2 networks, apart from L3 networks, by communicating with L2 protocols such as Virtual Router Redundancy Protocol (VRRP) which support route-tracking. In fact, since SRd 24 interacts with L3, L2 and Stateful Sync components of router operating systems, respective debugging commands can be used to troubleshoot SRd 24 interactions. SRD 24 may also generate Simple Network Management Protocol (SNMP) traps for state changes. SNMP traps may be used, for example, to notify another device of a change in state of one of an application executing on one of the redundant service gateways. SNMP traps do this by sending a message known as a trap of the event to the other device.

In one example approach, an if-route-exists condition detects the presence or absence of a signal-route. In one such example approach, a change in the presence or absence of a particular signal-route is advertised using as-path-prepend values. In one such example approach, a change in the presence or absence of a particular signal-route is advertised using different local-preference values.

Another potential advantage of this methodology is the ability for applications to drive resiliency of the application overlay network over both L2 and L3 networks in a protocol-agnostic manner. The techniques described may allow for applications to create an overlay network of peers and allows for applications 62 to drive and adapt the routing over the underlying network. It also allows for a geo-redundant inter-chassis redundancy solution. In a real-world application, the approach reduced route convergence time by 95% (convergence was in about a second), ensuring uninterrupted failovers for millions of application sessions across the overlay network for a 99.999% High Availability.

In one example, the signal-routes are static routes manipulated by SRd 24 based on the mastership state changes. An example of adding a static route is:
   root@SG2# show policy-options redundancy-policy ACQU_MSHIP_POL
and the result is:
```
    redundancy-events PEER_MSHIP_RELS_EV;
    then {
       acquire-mastership;
       add-static-route 10.45.45.0/24 {
         receive;
         routing-instance SGI-PRIVATE;
       }
    }
```
where routing protocol daemon 142 adds a new static route at 10.45.45.0/24.

In some example approaches, routing policies advertise routes based on the existence or non-existence of signal-routes. In one such example approach, routing policies are preconfigured to advertise routes based on the existence or non-existence of signal-routes using the if-route-exists condition. For example,

```
    policy-options {
       condition ROUTE EXISTS{
          if-route-exists {
             10.45.4.0/24;
             table SGI-PRIVATE.inet.0;
          }
       }
    }
```

-continued

```
    and
    policy-statement BGP-EXPORT-DEF-V6-ONLY {
       term 1 {
          from {
             prefix-list default-route-v6;
             condition ROUTE_EXISTS;
          }
          then {
             as-path-prepend "64674 64674 64674 64674";
             next-hop self;
             accept;
          }
       }
    }
```

In this example, a check is made in the prefix-list to determine if the route 10.45.45.0/24 exists and, if the route is not present, SRd 24 increases the cost of the route using the as-path-prepend command. The Autonomous System (AS) path prepend can be used to tell other routing entities in system 4 to route to a gateway device having a lower routing cost, which also is the gateway device next in line to assume mastership. BGP prefers the shortest AS path to reach a destination. The path that BGP will choose to reach a destination can be manipulated using AS path prepending. AS path prepending allows for artificially lengthening the AS path that BGP advertises to a neighbor. An example as-path-prepend approach is further illustrated in FIG. 9.

In another example approach, as shown in FIG. 10, the presence or absence of the signal-route is advertised through the use of local-preference values. A local-preference value is a metric used by BGP sessions to indicate the degree of preference for an external route. The route with the highest local preference value is preferred. The local-preference attribute is used in inbound routing policy and is advertised to internal BGP peers and to neighboring confederations. In one such approach, a service gateway master defaults its local-preference value to, for example, 400, while the standby defaults to 350. If mastership transitions to the standby gateway, its local-preference value may be, for example, raised to 450, while the former master retains its local-preference value of 400.

In some examples, SRd 24 drives L2 connectivity via VRRP route tracking. VRRP is a layer-2 (switching) protocol unlike the routing protocols explained earlier. VRRP route tracking is a VRRP feature which tracks the reachability of signal-routes in order to vary the VRRP priorities dynamically. In one example approach, VRRP route tracking is used to help advertise the route switching signaling the change of mastership. In one such example, VRRP route tracking is configured as follows:

```
    interfaces {
       ge-1/0/1 {
          unit 0 {
             vlan-id 1;
             family inet {
                address 200.100.50.1/24 {
                   vrrp-group 0 {
                      virtual-address 200.100.50.101;
                      priority 200;
                      track {
                         route 10.45.45.0/24 ;
                         table SGI-PRIVATE.inet.0;
                      }
    }...
```

Figure 11:
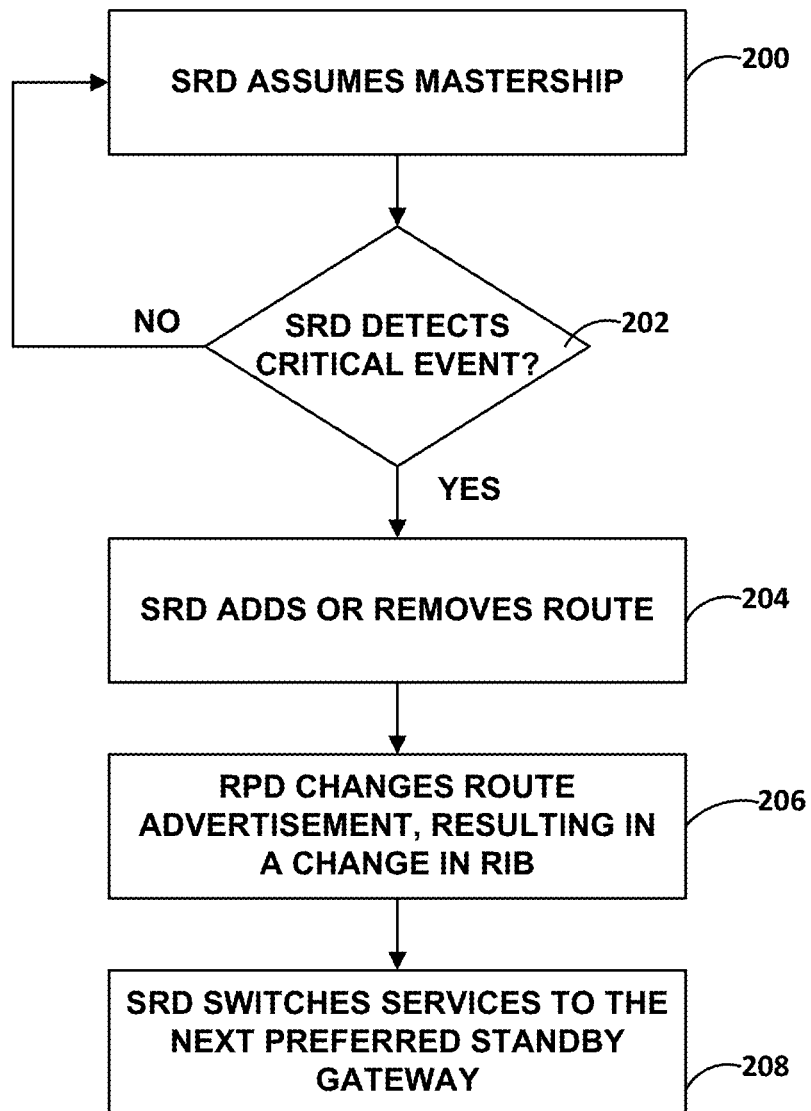
FIG. 11 is a flowchart illustrating services switchover to a peer in accordance with techniques described herein.

FIG. 11 is a flowchart illustrating services switchover to a peer in accordance with techniques described herein. In the example shown in FIG. 11, SRd 164 assumes mastership (200) and begins to monitor for critical events as defined by the redundancy events configuration (202). If SRd 164 detects that a critical event occurs, SRd 164 adds or removes a route based on a relevant route policy (204). In one example approach (e.g., where SRd 164 is executing on a gateway that is no longer the master), SRd 164 also notifies the preferred standby gateway 8 that it is to take over mastership. In one such example approach, SRd 164 notifies SRd 164 of the preferred standby gateway 8A using ICCP.

Gateway 8 then advertises the change in routes, resulting in a change in routing information base 140 (206). In one example approach, VRRP is used to communicate the advertised priorities for one or more routes. Routers in the network receive the advertisements and, based on the advertised routes, begin forwarding network traffic to the next preferred standby gateway 8 for application of services (208).

In one example approach, each SR daemon 164 on the routing engine continuously monitors preconfigured redundancy events. On the occurrence of a redundancy event, SRd 164 a) adds or removes signal-routes from RIB 140 as specified in the redundancy policy and b) updates Stateful Sync roles accordingly. Stateful sync refers to session-level redundancy provided on the service cards 136A, 136B of gateway 8. In one such approach, each service 10 maintains its own application state and shares that application state with its counterparts in standby gateways 8. In some examples, SRd 164 maintains the application state associated with each of the services 10 and shares the application state.

In one example approach, the addition or removal of signal-routes by SRd 164 causes routing protocol daemon 142 to send a routing protocol update message to routing protocol peers to advertise the changes in the routes. In one such example approach, this involves changing the cost of the route via, for example, the as-path-prepend command discussed above.

In some example approaches, the route change also has an effect on the VRRP configuration tracking this route, resulting in different VRRP priority advertisements as noted above. The newly advertised routes and changed VRRP priorities redirect traffic to the next preferred standby gateway 8, and SRd 164 switches over the services mastership to that gateway 8. In some such example approaches, VRRP is also used to communicate, to a SRd 164 in another gateway 8, the need for a mastership transition.

Figure 12:
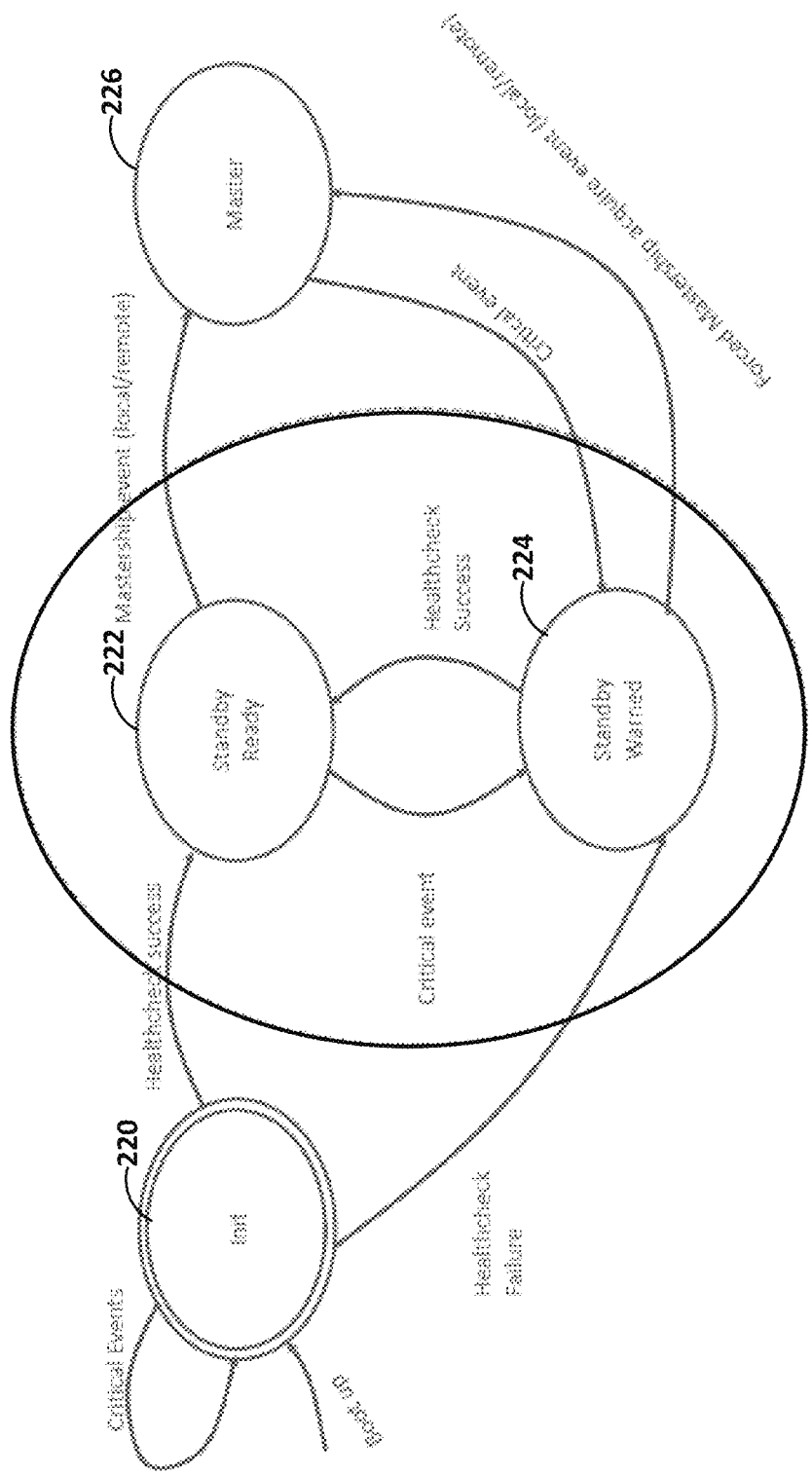
FIG. 12 is a block diagram illustrating a redundancy set state machine for moving between master and standby states in accordance to the techniques described herein.

FIG. 12 is a block diagram illustrating a redundancy set state machine for moving between master and standby states in accordance to the techniques described herein. The state machine of FIG. 12 shows the states of an instance of service redundancy daemon 24 of a gateway 8 in system 27. As can be seen in FIG. 12, SRd 164 boots into an Init state (220) and remains there until SRd 164 receives a health check success or failure. In one example approach, a gateway assigned three redundancy sets maintains three instances of the state machine shown in FIG. 12. In one such example approach, each state machine operates independently of the other.

On a health check success, control moves to a Standby Ready state (222), and remains there until a critical event occurs or a mastership event occurs. On a health check failure, control moves to a Standby Warning state (224), and remains there until a health check success occurs or a forced mastership event occurs.

On a critical event, control moves from state 222 to a Standby Warned state 224. On a mastership event, control moves from state 222 to a Master state 226. Once in the Master state 226, gateway 8 remains in the Master state (226) until a critical event occurs. If a critical event occurs, gateway 8 moves to a Standby Warned state (224). Once in the Standby Warned state (224), gateway 8 remains in that state until a forced mastership acquire event forces it back to the Master state (226), or a health check success moves it back into the Standby Ready state (222).

In some example approaches, SRd 164 sets a timer on gateway 8 entering Standby Warned state (224). When the timer times out, SRd 164 checks to determine if gateway 8 has recovered from the event. If so, control moves back to Standby Ready state (222). In some such example approaches, control remains in Standby Warned state 224 until it is initialized or has received a health check success. In some such example approaches, a check is made each time the timer times out to see if the critical event has been resolved. Other standby states may be added to reflect intermediate standby states.

The techniques described above may be extended to the control of other services and devices in the network. Since master and standby state changes drive the addition and deletion of routes, changes in the routes can be used, for example, to change the operation of a firewall to, for instance, the approach desired for a particular master, a particular standby device or a particular combination of standby devices. In one example approach, route changes are used to dynamically change the operation of services such as firewall filters to, for instance, reflect the needs or configuration of the current master. The change may be as simple as disabling a filter, or it may involve the configuration of a number of different devices and a variety of protocols. In one example approach, master and standby state changes drive, for instance, the enabling and disabling of firewall filters, or may redirect traffic to a peer gateway.

Figure 13:
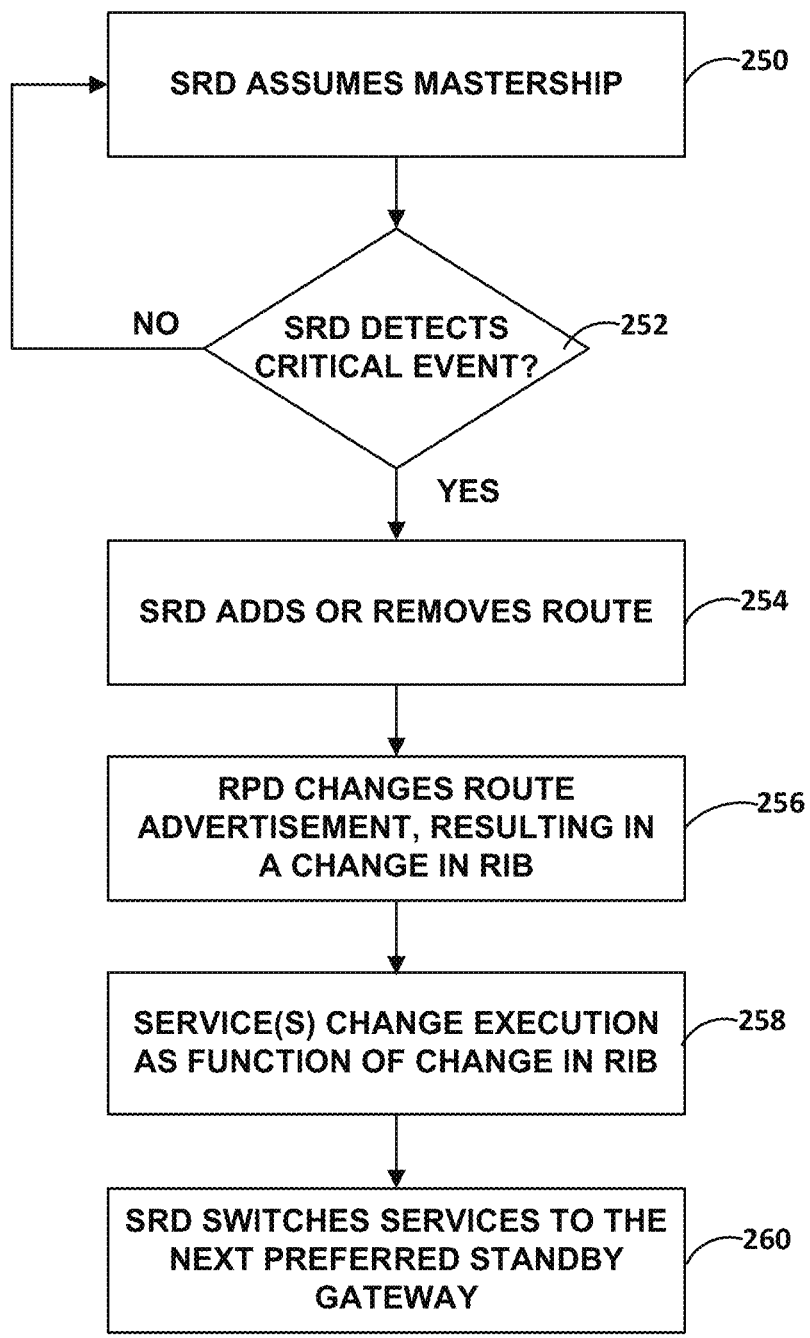
FIG. 13 is a flowchart illustrating changes in services as a function of the changes in signal-routes during switchover to a peer in accordance with techniques described herein.

FIG. 13 is a flowchart illustrating changes in services as a function of the changes in signal-routes during switchover to a peer in accordance with techniques described herein. In the example shown in FIG. 13, SRd 164 assumes mastership (250) and begins to monitor for critical events as defined by the redundancy events configuration (252). If SRd 164 detects that a critical event occurs, SRd 164 adds or removes a route based on a relevant route policy (254). In one example approach (e.g., where SRd 164 is executing on a gateway that is no longer the master), SRd 164 also notifies the preferred standby gateway 8 that it is to take over mastership. In one such example approach, SRd 164 notifies SRd 164 of the preferred standby gateway 8A using ICCP.

Gateway 8 then advertises the change in routes, resulting in a change in routing information base 140 (256). In one example approach, VRRP is used to communicate the advertised priorities for one or more routes. In one example approach, devices in service provider core network 7 receive the advertisements and modify the services they provide to reflect the change in signal-routes (258). Routers in the network receive the advertisements and, based on the advertised routes, begin forwarding network traffic to the next preferred standby gateway 8 for application of services (260).

In one example approach, each SR daemon 164 on the routing engine continuously monitors preconfigured redundancy events. On the occurrence of a redundancy event, SRd 164 a) adds or removes signal-routes from RIB 140 as specified in the redundancy policy and b) updates Stateful Sync roles accordingly. Stateful sync refers to session-level redundancy provided on the service cards 136A, 136B of gateway 8. In one such approach, each service 10 maintains its own application state and shares that application state with its counterparts in standby gateways 8. In some examples, SRd 164 maintains the application state associated with each of the services 10 and shares the application state.

In one example approach, the addition or removal of signal-routes by SRd 164 causes routing protocol daemon 142 to send a routing protocol update message to routing protocol peers to advertise the changes in the routes. In one such example approach, this involves changing the cost of the route via, for example, the as-path-prepend command discussed above.

In some example approaches, the route change also has an effect on the VRRP configuration tracking this route, resulting in different VRRP priority advertisements as noted above. The newly advertised routes and changed VRRP priorities redirect traffic to the next preferred standby gateway 8, and SRd 164 switches over the services mastership to that gateway 8. In some such example approaches, VRRP is also used to communicate, to a SRd 164 in another gateway 8, the need for a mastership transition. Finally, these advertisements serve to change the configurations of one or more services, as will be discussed next.

Examples illustrating use of signal-routes to configure operation of services provided by a network device such as service gateway 8 are shown in FIGS. 14-18 and described next.

Figure 14:
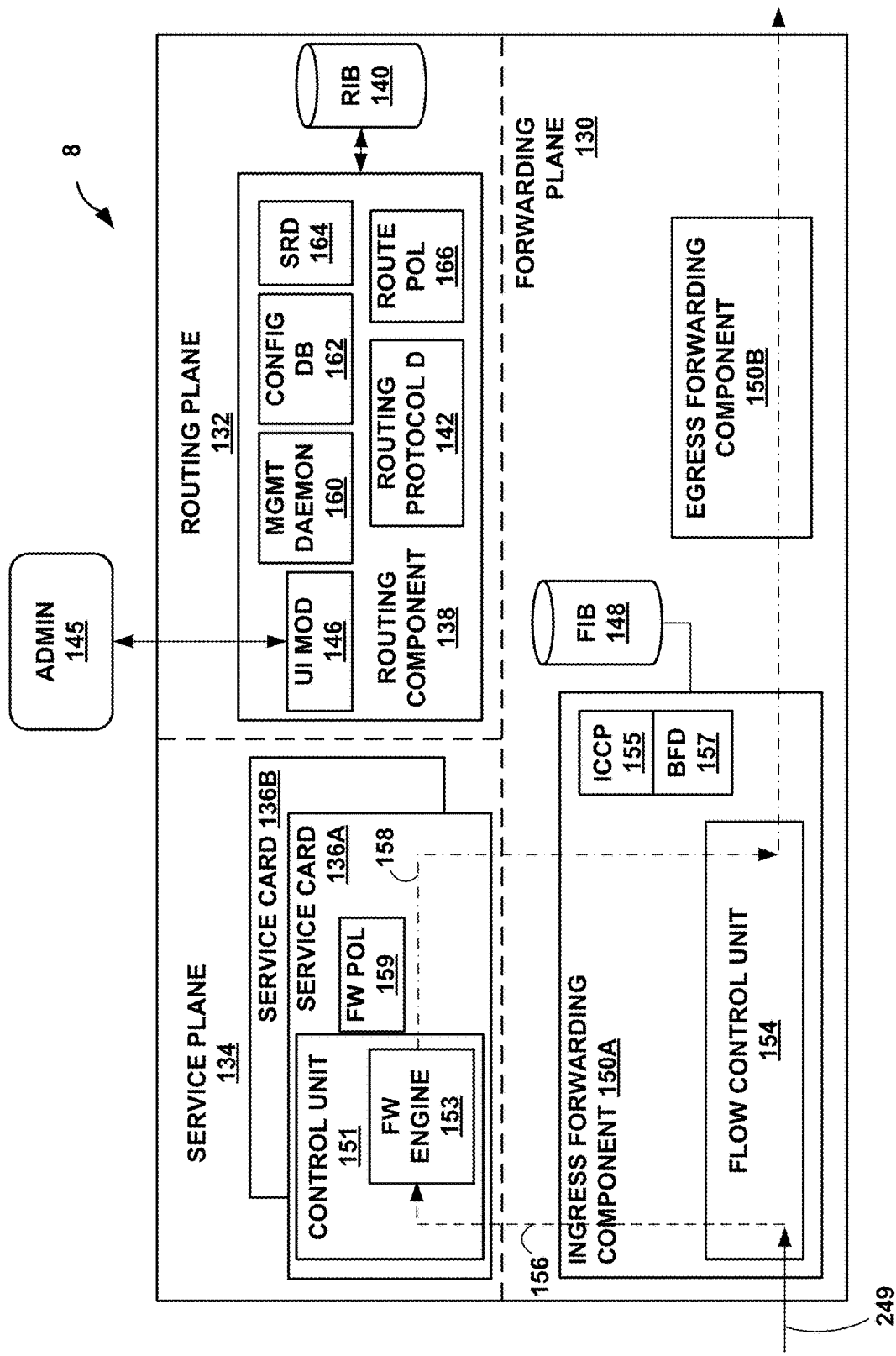
FIG. 14 is a block diagram illustrating an example set of service chains of services according to one or more aspects of the techniques described herein.
Figure 15:
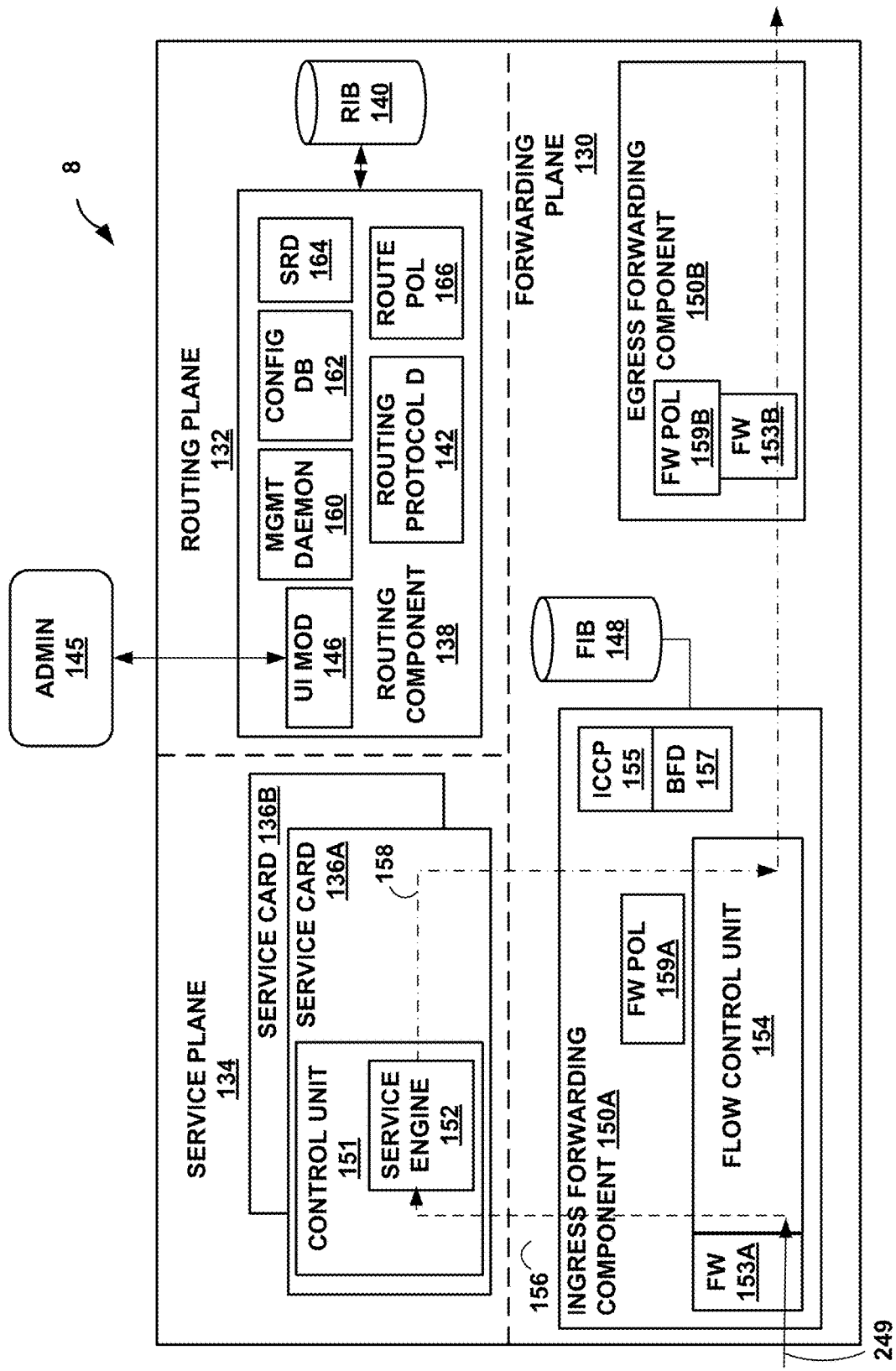
FIG. 15 is a block diagram illustrating another example service gateway in accordance with one or more aspects of the techniques described in this disclosure.

FIG. 15 is a block diagram illustrating another example service gateway in accordance with one or more aspects of the techniques described in this disclosure. In the example of FIG. 14, the service gateway network device (service gateway 8) includes a forwarding plane 130, a routing plane 132 and a service plane 134. Forwarding plane 130 may be provided by dedicated forwarding integrated circuits normally associated with high-end routing and forwarding components of a network router.

Service gateway 8 may integrate a routing plane 132 and a service plane 134 in a manner that utilizes shared forwarding plane 130. As in the service gateway 8 of FIG. 3, forwarding plane 130 may represent a rich and dynamic shared forwarding plane, in some cases distributed over a multi-chassis router. Moreover, forwarding plane 130 may be, as noted above, provided by dedicated forwarding integrated circuits normally associated with high-end routing components of a network router such that routing plane 132 and forwarding plane 130 operate as a high-end router. In one example approach, service plane 134 may be tightly integrated within service gateway 8 (e.g., by way of service cards 136) so as to use forwarding plane 130 of the routing components in a shared, cooperative manner.

As seen in FIG. 14, routing plane 132 provides a routing component 138 that is primarily responsible for maintaining a routing information base (RIB) 140 to reflect the current topology of a network and other network entities to which service gateway 8 is connected. For example, as noted above, routing component 138 provides an operating environment for execution of routing protocols by a routing protocol process such as routing protocol daemon 142 (RPd). Routing protocol daemon 142 may represent a software component or module that communicates with peer routers and periodically updates RIB 140 to accurately reflect the topology of the network and the other network entities. While described as a daemon or software module executed by routing engine 44, routing daemon 61 may be implemented as a hardware module or as a combination of both hardware and software.

Routing component 138 may receive this routing information via routing protocol daemon 142 and update or otherwise maintain RIB 140 to reflect a current topology of core network 7. This topology may provide for multiple different paths through core network 7 to reach any given subscriber device 16. In the example of FIG. 1, a path exists from public network 12 through each of service gateways 8 to subscriber devices 16. Routing component 138 in one of the gateways 8 may, in some instances, select the path to use to connect a subscriber device 16 to public network 12.

In the example shown in FIG. 14, admin 145 may interface with routing component 138 via a user interface (UI) module 146, which may represent a module by which a user or provisioning system may interface with routing component 138. UI module 146 may, for example, include a command line interface (CLI), which may accept inputs in the form of commands and/or scripts, or may include a graphical user interface (GUI). An administrator ("admin 145") may interface with UI module 146 to configure various components service gateway 8, including routing component 138. Once configured, routing component 138 may then resolve RIB 140 to generate forwarding information. Routing component 138 may then interface with forwarding plane 130 to install this forwarding information into a forwarding information base (FIB) 148.

Ingress forwarding component 150A and egress forwarding component 150B ("forwarding components 150") may represent software and/or hardware components, such as one or more interface cards (not shown), that forward network traffic. The terms "ingress" and "egress" are relative terms that refer to the packet flow direction of a packet 149 entering service gateway 8 as illustrated in FIG. 14. In one example approach, forwarding component 150A maintains FIB 148 that associates network destinations with specific next hops and corresponding interface ports of output interface cards of service gateway 8. In some such example approaches, routing component 138 generates FIB 148 in the form of a radix tree having leaf nodes that represent destinations within network 7.

As seen in FIGS. 3, 14 and 15, service plane 134 may represent a logical or physical plane that provides one or more services using service cards 136. Service cards 136A and 136B (collectively "service cards 136") may represent physical cards that are configured to be inserted into service gateway 8 and coupled to forwarding plane 130 and routing plane 132 via a backplane, switch fabric or other communication medium. Service cards 136 may, for instance, comprise cards that couple directly to the switch fabric. Service cards 136 may be removable from service gateway 8.

Figure 16:
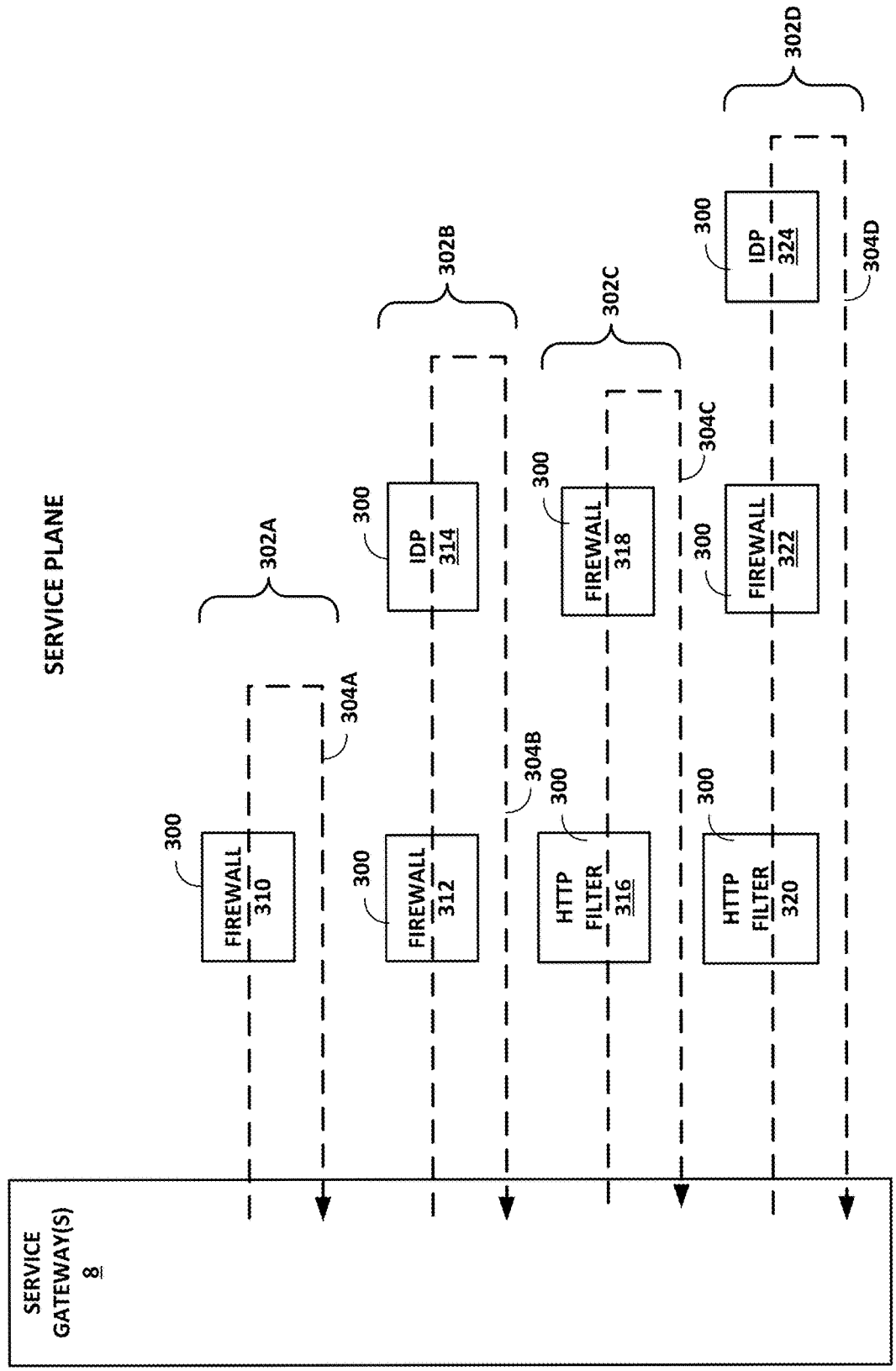
FIG. 16 is a block diagram illustrating yet another example service gateway in accordance with one or more aspects of the techniques described in this disclosure.

Admin 145 may interface with UI module 146 to interface with routing component 138 to specify which packet flows are to undergo service processing by one or more of service cards 136. After specifying these flows, routing component 138 may update RIB 140 to reflect that these flows are to undergo service processing, such that when resolving FIB 148, the forwarding information may indicate that various flows are to undergo service processing. Often, this forwarding information may specify that these flows require service processing by specifying a next hop for these flows that directs packets of these flows to one of service cards 136 (where this next hop may be referred to as an "internal next hop"), as described in further detail below. Additional next hops may be specified that are external to service gateway 8, where the external next hop may specify, in this example, on which path the packet is to be forwarded. The internal next hop may be linked to the external next hop, where in this example, service gateway 8 may maintain two next hops (and possibly more) for any given flow. The example of FIGS. 4 and 16 illustrate service chains that take advantage of these internal and external hops to apply a series of services to a packet, packet flow or session.

Service cards 136 may each represent a card capable of applying one or more services. In the example shown in FIG. 14, service card 136A implements a firewall service via a firewall engine 153 and firewall policy storage 159. In some examples, firewall engine 153 receives firewall rules (e.g., via UI module 146) and stores the firewall rules at firewall policy storage 139 to be applied by firewall engine 153. In some examples, routing component 138 stores firewall policies in routing plane 132 or forwarding plane 130.

Service card 136 may include a control unit 151, which may represent one or more general processors that execute software instructions, such as those used to define a software or computer program, stored to a non-transitory computer-readable medium such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, control unit 151 may represent dedicated hardware as discussed above. In some instances, control unit 151 may be referred to as a processor.

In the example of FIG. 14, forwarding component 150A receives a packet 249 and, acting as an ingress forwarding component, invokes a flow control unit 154. Flow control unit 154 represents a module that selectively directs packets to service plane 134 for processing. In some example approaches, service plane 134 is a virtual machine. Flow control unit 154 may access FIB 148 to determine whether packet 249 is to be sent to an internal next hop, e.g., one of service cards 136 of service plane 134, or to an external next hop via another one of forwarding components that acts as an egress forwarding component for the flow to which packet 249 corresponds, such as, e.g., egress forwarding component 150B.

In any event, flow control unit 154 may determine that packet 249 is to be transmitted to service card 136A for application by firewall engine 153 of the firewall rules stored in firewall policy storage 139. In response to determining that packet 249 is to be transmitted to service card 136 so that service card 136 can apply a service to packet 249, in some examples, flow control unit 154 of ingress forwarding component 150A may append an internal service packet header (which may also be referred to as a "service cookie") before directing packet 156 to service card 136A of service plane 134. Service card 136A may receive this packet and remove the internal service packet header, parsing the ingress identifier from the internal service packet header. Control unit 151 of service card 136 may then invoke a service engine such as firewall engine 153, which applies the firewall policy rules to updated packet 156, generating a serviced packet 158 that has had the service applied.

Service card 136A may then determine an internal next hop to which to forward the serviced packet 158 along the service chain. In the example of FIG. 14, service card 136A transmits serviced packet 158 back to flow control unit 154, which, in this example, forwards the serviced packet 158 to egress forwarding component 150B. Egress forwarding component 150B in turn looks up a next hop to which to forward packet 158 forwards packet 158 to the next hop.

In some example approaches, firewall services may alternatively or additionally be implemented in one or more of the ingress forwarding component 150A and the egress forwarding component 150B. In some example approaches, a firewall network device separate from service gateways 8A and 8B (such as service node 13 in FIG. 1) provides firewall services.

In some example approaches, an administrator can configure a firewall filter to 1) restrict traffic destined for the Routing Engine based on its source, protocol, and application, 2) limit the traffic rate of packets destined for the Routing Engine to protect against flood, or denial-of-service (DoS) attacks, and 3) handle fragmented packets destined for the Routing Engine. In some such approaches, an administrator may define stateless firewall filters. In some example approaches firewall engine 153 includes a stateless firewall filter used to enhance security through the use of packet filtering. Packet filtering enables firewall engine 153 to inspect the components of incoming or outgoing packets and then perform the actions specified on packets that match the criteria specified. The typical use of a stateless firewall filter is to protect the Routing Engine processes and resources from malicious or untrusted packets.

In some example firewall engines 153, an administrator configures filters on service gateway 8 to filter packets passing through the gateway 8. In one such approach, the administrator configures firewall engine 153 by grouping source and destination prefixes into disjoint sets defined as source classes and destination classes. In one such approach, source class usage (SCU) filters packets as a function of the Internet Protocol (IP) source address, or the IP source address and the IP destination address. SCU, therefore, makes it possible to track and/or filter packet traffic originating, for instance, from specific prefixes on the service provider core network 7 to specific prefixes on the customer edge.

Destination class usage (DCU), on the other hand, filters packets from customers by performing lookups of the IP destination address. DCU makes it possible, therefore, to track and/or filter traffic originating from the customer edge and destined for specific prefixes on service provider core router network 7.

In one example approach, firewall engines 153 may be configured to protect service gateway 8 from excessive traffic transiting the router to a network destination or from traffic destined for the Routing Engine. Firewall filters that control local packets can also protect service gateway 8 from external incidents such as denial-of-service attacks.

In one example approach, an administrator may configure firewall engine 153 to control the data packets accepted on and transmitted from the physical interfaces. In one such example approach, the administrator may also control the local packets transmitted from the physical interfaces and to routing component 138. In one local packet filtering approach, an administrator applies firewall filters on a loopback interface, which is the interface to the routing component 138, to control local packets.

FIG. 15 is a block diagram illustrating yet another example service gateway in accordance with the techniques described in this disclosure. In the example shown in FIG. 15, the firewall service is provided by firewall policy storage 159A and firewall engine 153A in ingress forwarding component 150A and by firewall policy storage 159B and firewall engine 153B in egress forwarding component 150B. In some example approaches, firewall policy storage 159A and firewall engine 153A in ingress forwarding component 150A provide all firewall services in service gateway 8 while in other example approaches firewall policy storage 159B and firewall engine 153B in egress forwarding component 150B provide all firewall services in gateway 8. In yet other example approaches, service gateway forwards packets to a separate firewall network device (such as service node 13 in FIG. 1) where the firewall network device applies the desired firewall services before passing the packet back to gateway 8.

FIG. 16 is a block diagram illustrating an example set of service chains of services according to one or more aspects of the techniques described herein. In one example approach, FIG. 16 illustrates a set of service chains 302A-302D supported by a service gateway 8. Service chains 302 represent an example set of service chains provided by computer security services 300 within, or external to, one or more service gateways 8.

In this example, a service gateway 8 directs one or more subscriber packet flows 304A along a first service chain 302A to receive firewall service 310. Similarly, a service gateway 8 directs one or more subscriber packet flows 304B along a second service chain 302B for application of firewall service 312 and intrusion detection and prevention (e.g., deep packet inspection) service 314. In service chain 302C, a service gateway 8 directs packet flows 304C to a HTTP filter 316 and a firewall service 318. In service chain 302D, a service gateway 8 directs packet flows 304D to HTTP filter 320, firewall service 322 and intrusion detection and prevention (e.g., deep packet inspection) service 324.

In one such example approach, service gateway 8 receives notice of a signal-route change and uses the change in signal-route to dynamically change the operation of services such as firewall service 312 and intrusion detection and prevention (e.g., deep packet inspection) service 314. The change may be as simple as disabling a filter, or it may involve the configuration of a number of different devices and a variety of protocols. In one example approach, master and standby state changes drive, for instance, the enabling and disabling of firewall filters, or may redirect traffic from a former master to the new master gateway. This ability to change operation of devices such as firewalls and other services will be described in the context of firewall configuration, but can be extended to other devices that operate on packets, such as HTTP filter 316 and intrusion detection and prevention service 314.

As can be seen in FIGS. 14 and 15, routing plane 132 includes a management daemon 160 coupled to user interface module 146 and to a configuration database 162. Management daemon 160 receives configuration information from user interface module 146 and stores the configuration information in configuration database 162. In some examples, routing plane 132 also includes a services redundancy daemon (SRd) 164 (also referred to herein as a services redundancy process), which operates in conjunction with route policies database 166 to configure and control redundant services delivery system 27. SRd 164 also interfaces with service plane 134, such as to permit configuration of service cards 136A, 136B by management daemon 160. SRd 164 may represent a software module that updates RIB 140 based on configuration database 162 and route policies database 166. While described as a daemon, software process, or software module executed by routing component 138, SRd 164 may be implemented as a hardware module or a combination of both hardware and software.

User interface module 146 may represent a software and/or hardware module that presents an interface with which an administrator or an administrative device, represented by "ADMIN" 145, may interact to specify certain operational characteristics of services redundancy gateway network device 8. In response to invocation by admin 145, user interface module 146 interacts with other components of services redundancy gateway network device 8, such as to retrieve, configure, copy, and/or delete policy configuration data stored in route policies database 166, update service data of services plane 143 via SRd 164, and to perform other management-related functions. In one example approach, admin 145 may interact with user interface module 146 to enter configuration information for SRd 164, such as configuration information defining redundancy events, redundancy policies, redundancy sets and redundancy groups; this configuration information is also stored in configuration database 162.

In one such example approach, on assuming mastership, services redundancy daemon 164 in services gateway 8 begins to monitor for critical events as defined by the redundancy events configuration. If SRd 164 detects that a critical event occurred, SRd 164 adds or removes a route from the RIB 140 based on a relevant route policy stored in route policies database 166. In some example approaches, SRd 164 implements a routing policy configured to advertise routes based on the existence or non-existence of signal-routes using the if-route-exists condition as discussed above.

In one example approach (e.g., where SRd 164 is executing on a gateway that is no longer the master), SRd 164 also notifies the preferred standby gateway 8 that it is to take over mastership. In one such example approach, SRd 164 notifies the services redundancy daemon 164 of the preferred standby gateway 8A of the change using ICCP.

As noted above, a gateway 8 may use signal-route changes to dynamically change the operation of services such as firewall filters to, for instance, reflect the needs or configuration of the current master service gateway. The change may be as simple as disabling a filter, or it may involve the configuration of a number of different network devices and service cards and a variety of protocols. In one such approach, master and standby state changes drive the addition and deletion of signal-routes and these changes may be used to change the operation of firewall engine 153.

In one example approach, SRd 164 executing on gateway 8 detects an event and executes a service redundancy policy stored in route policies database 166. In one such approach, the service redundancy policy defines changes to services executing on one or more service cards 136. For instance, SRd 164 may change the configuration of firewall engine 153 by writing firewall configuration bits read from the service redundancy policy to firewall policy storage 159 or to registers in firewall engine 153. The firewall configuration bits, in some instances, may change the data rate of certain packet traffic, may discard certain packet traffic, or may perform other services on such traffic. In some approaches, traffic is grouped as defined in the service redundancy policy and firewall actions (also as defined in the service redundancy policy) are defined by group and applied to particular groups.

In another example approach, the service redundancy policy defines changes to one or more services based on the existence or non-existence of signal-routes using the if-route-exists condition as discussed above. In one such approach, the service redundancy policy defines changes to services executing on one or more service cards 136. For instance, SRd 164 may change the configuration of firewall engine 153 by writing firewall configuration bits as discussed above. The firewall configuration bits, in some instances, may change the data rate of certain packet traffic, may discard certain packet traffic, or may perform other services on such traffic. In some approaches, traffic is grouped as defined in the service redundancy policy and firewall actions (also as defined in the service redundancy policy) are defined by group and applied to particular groups.

Figure 17:
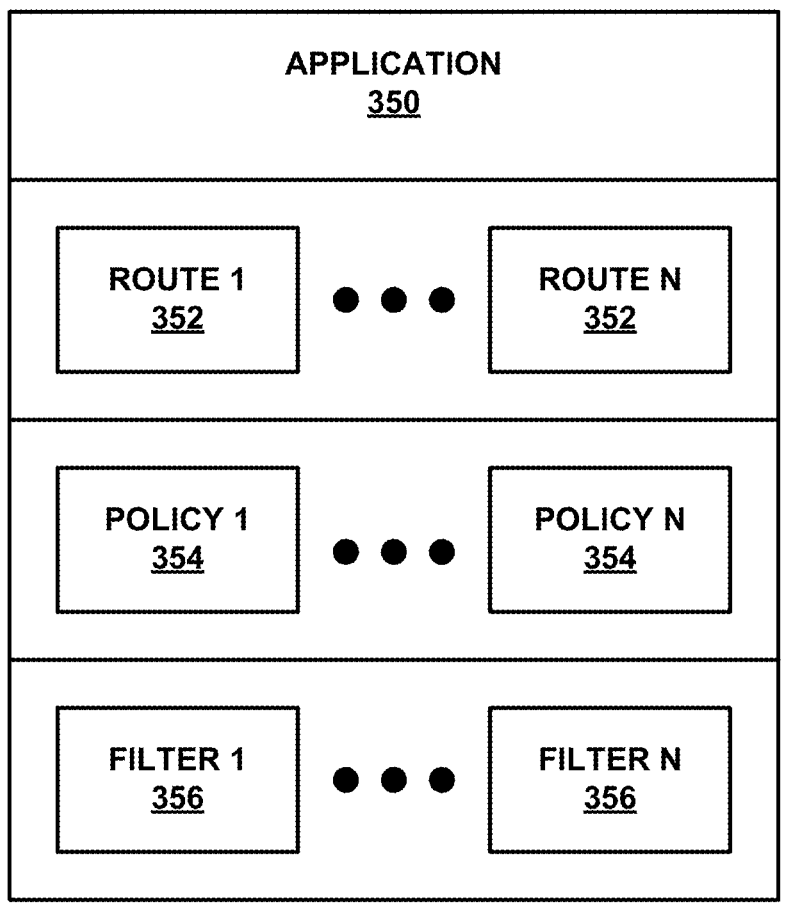
FIG. 17 is a block diagram illustrating the use of signal routes to change class markings and the use of class markings to change firewall policies in accordance with one or more aspects of the techniques described in this disclosure.

FIG. 17 is a block diagram illustrating the use of signal routes to change a service-related configuration, such as a firewall policy, in accordance with one or more aspects of the techniques described in this disclosure. In one example approach, SRd 164 detects a redundancy event associated with redundant application 350 and updates the appropriate signal routes 352 based on the redundancy event to reflect the change in mastership. In response to the changes in the signal routes 352, RPd 142 changes the route advertisement, resulting in a change in RIB 140. In one example approach, the changes in RIB 140 invoke policy statements in redundancy policy 354 to, for instance, change class markings (e.g., SCU or DCU markings). The firewall policies for one or more of filters 356 are then changed to reflect the new class markings. In another example approach, the changes in RIB 140 invoke policy statements in redundancy policy 354 to, for instance, change markings that are not associated with classes. The firewall policies for one or more of filters 356 are then changed to reflect the new markings. In yet another example approach, the changes in RIB 140 invokes policy statements in a service redundancy policy 354 to modify a service, such as a firewall or other security-related service, on one or more of the service cards 136, as detailed in FIG. 13.

Figure 18:
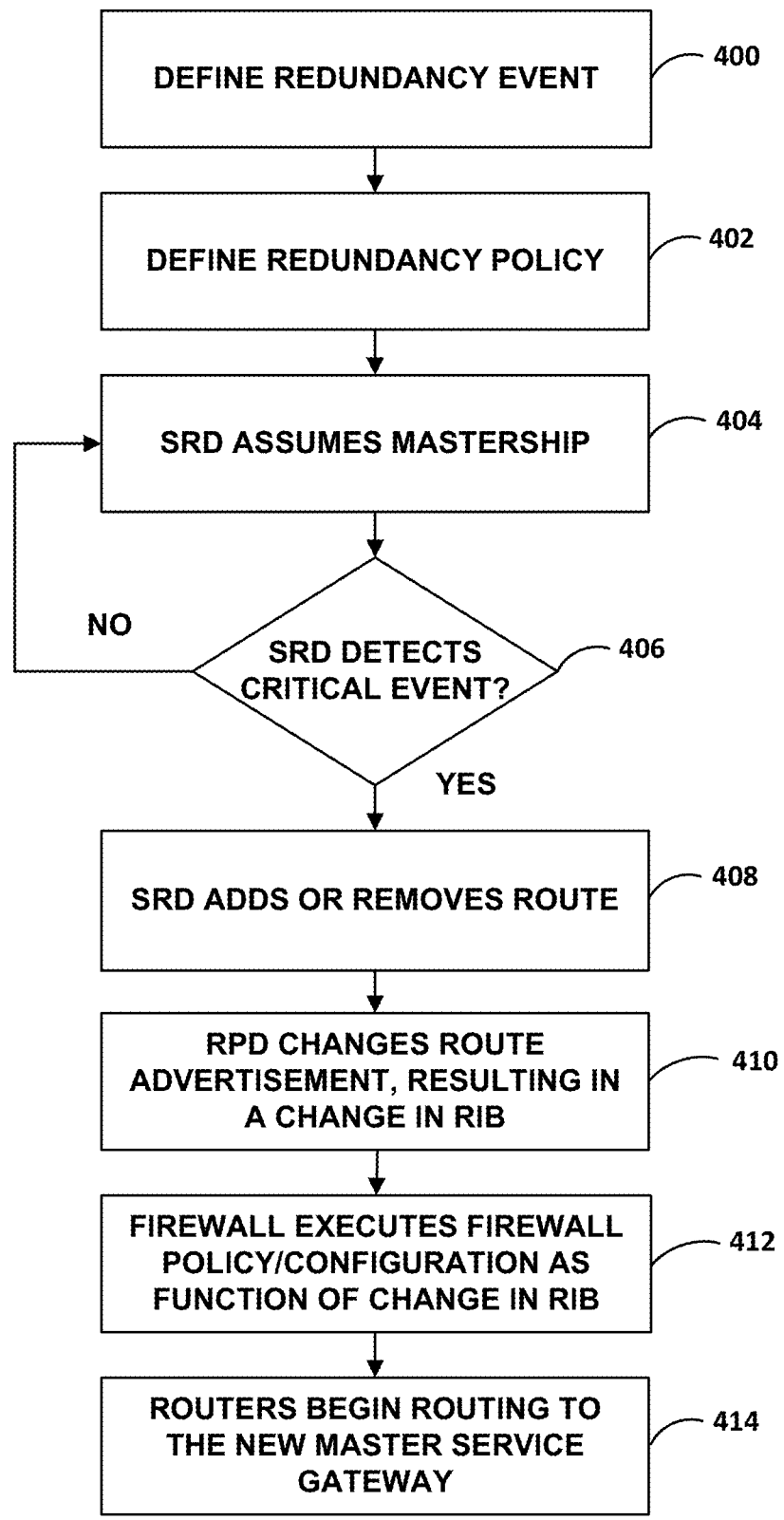
FIG. 18 is a flowchart illustrating example configuration of services as a function of the changes in signal-routes during switchover to a peer in accordance with one or more aspects of techniques described herein.

FIG. 18 is a flowchart illustrating example configuration of services as a function of the changes in signal-routes during switchover to a peer in accordance with techniques described herein. FIG. 18 is described for purposes of example in terms of example operation of a service gateway such as service gateway 8 of FIG. 15 or 16. In the example shown in FIG. 18, service gateway 8 receives configuration data defining a redundancy event (400). For example, service gateway 8 receives configuration data defined by an administrator 145. In one such example, administrator 145 defines a redundancy event ACQU_MSHIP_MANUAL_EV and configures the redundancy event to monitor link down events, such as via the following example input:

```
redundancy-event ACQU_MSHIP_MANUAL_EV {
    monitor {
        link-down {
            xe-2/0/0;
            xe-2/0/0.0;
            xe-2/0/3;
            xe-2/0/3.0;
        }
    }
}
```

Service gateway 8 receives configuration data defining a redundancy policy at 402. The redundancy policy details the actions an application executing in service gateway 8 should take in the event of any of the link-down conditions monitored by the redundancy event ACQU_MSHIP_MANUAL_EV. An example redundancy policy for redundancy event ACQU_MSHIP_MANUAL_EV follows:

```
root@ mytouch3g # show policy-options redundancy-
    policy   ACQU_MSHIP_POL   redundancy-events
    ACQU_MSHIP_MANUAL_EV;
then {
    acquire-mastership;
    add-static-route 4.3.2.2/31 {
        receive;
        routing-instance SGI-PRIVATE;
    }
}
```

In the example shown in FIG. 18, SRd 164 of routing component 138 assumes mastership (404) and begins to monitor for critical events such as events defined by ACQU_MSHIP_MANUAL_EV (406). If SRd 164 detects that a critical event has occurred, SRd 164 adds or removes a route based on a relevant route policy stored in route policies database 166 (408) (such as a route policy defined based on the ACQU_MSHIP_POL presented above. In one example approach (e.g., where SRd 164 is executing on a gateway that is no longer the master), SRd 164 also notifies the preferred standby gateway 8 that it is to take over mastership. In one such example approach, SRd 164 notifies SRd 164 of the preferred standby gateway 8B using ICCP.

SRD 164 then advertises the change in routes (410) in the manner defined in the route policy stored, for instance, in route policies database 166. In one example approach, SRd 164 executes a route policy stored in route policies database 166 to communicate the advertised priorities for one or more routes via VRRP.

In one example approach, the state of each signal-route is shown in route-signal vector 70, such as illustrated in FIG. 8B. In the example shown in FIG. 8B, route-signal vector 70 includes one or more signal-routes 72 and one or more signal-route states 74 organized as signal-route/signal-route state pairs. The state of a particular signal-route 72 may, in some examples, be determined as follows:

```
root@mytouch3g # show policy-options {
    condition ROUTE EXISTS BNG2
        if-route-exists {
            4.3.2.4/31;
            table AnyCompany-Access-VR.inet.0;
        }
}
{master} [edit]
root@mytouch3g #
```

SRd 164 then executes redundancy policies tied to services or devices. In the example approach of FIG. 18, SRd 164 configures a firewall based on a service redundancy policy associated with the redundancy event (412). The firewall may be based on a firewall engine 153 such as is illustrated in FIGS. 14 and 15, or it may be a separate networked firewall device. For instance, in a firewall filter example, SRd 164 retrieves a service redundancy policy from route policies database 166 and applies the service redundancy policy to firewall engine 153 in service card 136A of FIG. 14 to change the operation of firewall engine 153. Routers in the network also receive the advertisements and, based on the advertised routes, begin forwarding network traffic to the next preferred standby gateway 8 for application of services (412).

The service redundancy policy may define rules to be added, deleted or modified in the rules stored in firewall policy storage 159 or configuration bits that are written to firewall policy storage 159 or to a register in firewall engine 153 to change the operation of firewall engine 153. In a similar manner, SRd 164 retrieves a service redundancy policy from route policies database 166 and applies the service redundancy policy to change the filter parameters of firewall engine 153A and/or firewall engine 153B of FIG. 15 or to add, delete or modify rules stored in firewall policy storage 159A or 159B. In one example approach, class-based filter match conditions are used to filter or to change the data rate of packet traffic based on a source or a destination address or on ranges of source addresses or destination addresses. Class-based filter conditions match packet fields based on source class (via, e.g., SCU) or destination class (via, e.g., DCU). A source class is a set of source prefixes grouped together and given a class name. A destination class is a set of destination prefixes grouped together and given a class name.

In one example approach, SRd 164 executes a service redundancy policy stored in route policies database 166 of service gateway 8 that modifies the firewall filter parameters by marking source class usage (SCU) bits in a register used by firewall engine 153. In another example approach, an administrator modifies the firewall filter parameters by marking destination class usage (DCU) bits in a register used by firewall engine 153. SRd 164 may, for instance, configure firewall engine 153 of FIG. 14 or firewall engine 153A of FIG. 15 to change the data rate of packets in a first SCU class or a first DCU class which discarding all traffic in a second SCU or a second DCU class. In one such approach, this configuration may include writing configuration bits to firewall engine 153 and modified rules to firewall policy database 159. In yet another example approach, SRd 164 retrieves a combination of configuration bits and firewall policy rules from a service redundancy policy stored in route policies database 166 and configures firewall engine 153 and firewall policy storage 159 to, for instance, cause firewall engine 153 to discard packet fragments when a given signal-route exists or does not exist.

In one example approach, service gateway 8 applies modifications to a firewall service provided by firewall engine 153, firewall engine 153A or firewall engine 153B based on an if-route-exists condition as follows:

```
regress@mytouch3g# run show configuration policy-options {
    policy-statement scu_policy_bng2
        term default {
            from condition ROUTE_EXISTS_BNG2;
            then {
                source-class route_exist_bng2;
                accept;
            }
        }
        term 1 {
            then {
                source-class_scu_bng_2;
                accept;
            }
        }
}
```

Firewall filters with match conditions based on the selected SCU bits filter the packets that match the conditions. In one example approach, filtered traffic flows to the Standby Service Gateway 8B. Network devices such as firewalls and intrusion detection and prevention (IDP) device may be configured in similar ways.

In one example approach class-based filter match conditions may be used to filter based on a source or a destination address. In one such example approach, an administrator may specify the source class in the following way:
[edit firewall filter inet filter-name term term-name]
from {
source-class scu_bng_2;
} then {
/* standard firewall actions */
}
Similarly, an administrator may specify a destination class:
[edit firewall filter inet filter-name term term-name]
from {
destination-class scu_bng_2;
} then {
/* standard firewall actions */
}

In one example approach, firewall actions are performed in a firewall engine 153 under control of rules stored in firewall policy storage 159. For instance, firewall policies may define that firewall engine 153 may perform a terminating action such as an "accept" or a "discard" to accept a received packet or discard a received packet, respectively, for example. Based on the firewall policies, firewall engine 153 may alternatively or additionally perform one or more nonterminating actions such as incrementing a counter, a logging information about the packet header, sampling the packet data, sending information to a remote host using system log functionality, forwarding the packet to a next hop, and applying a policer to rate-limit traffic, for example. Firewall engine 153 may alternatively or additionally perform a flow control action on the packet. Firewall engine 153 may implement standard firewall actions such as Deep Packet Inspection and actions to detect or mitigate distributed denial-of-service (DDOS) attacks.

In one example approach, as noted above, the firewall is a network device separate from the service gateway. In one such approach, the firewall includes a number of rules that define how the firewall acts on packet traffic. In one such example approach, one or more of the rules include an if-route-exists condition that selectively applies the firewall rules when a route exists. For instance, a firewall may be configured to perform a Deep Packet Inspection of packets when service gateway 8A is master but not when service gateways 8B or 8C are the master. In one such example approach, the firewall reads the contents of route signal vector 70 to determine if an address exists. In another such example, the SRd 164 that detected the event uses a service redundancy policy stored in route policies database 166 that sends new configuration data and/or firewall policy rules to the firewall. Similar route policies may be used to configure other services in service gateway 8 and services in other networked devices as well.

The techniques described above may offer advantages over previous approaches to redundancy between gateways. SR daemon 164 on routing component 138 may continuously monitor preconfigured Redundancy Events. On the occurrence of Redundancy Events, SR daemon 164 adds or removes Signal-routes specified in the Redundancy Policy and updates Stateful Sync roles appropriately. The resulting route change affects the routing policy connected to this route and causes routing protocols executing on the gateways to advertise routes differently. If VRRP is being used, VRRP configuration tracking of this route results in different VRRP priority advertisements. The newly advertised routes and VRRP priorities cause routing peers to redirect traffic to the standby gateway 8 and SRd 164 switches over the services mastership to the standby gateway 8. In one example approach, as noted above, VRRP may also be used to notify a SRd 164 on another gateway 8 that it is to take over mastership of the redundancy set.

In addition, the techniques described above may offer advantages in configuring network devices to reflect a change in mastership. In one such approach, for example, a change in mastership is used to implement changes in firewall policy.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various example approaches have been described. Aspects of these approaches are described in the following claims.

What is claimed is:

1. In a system having a plurality of network devices, wherein the plurality of network devices includes a first network device and a second network device, a method of modifying services provided by one or more of the network devices, the method comprising:
   identifying defined events in each of a plurality of applications, wherein the plurality of applications includes a first application and wherein the defined events include a first defined event associated with the first application;
   assigning a signal-route to each defined event, wherein assigning a signal-route to each defined event includes assigning a first signal-route to the first defined event;
   executing the first application within the first network device;
   detecting occurrence of the first defined event within the first application executing on the first network device; and
   in response to detecting occurrence of the first defined event within the first application executing on the first network device, modifying one or more services provided by the second network device, where modifying one or more services includes:
   modifying a routing information base (RIB) of the first network device, wherein modifying includes changing the RIB by adding the first signal-route to or removing the first signal-route from the RIB; and
   advertising, from the first network device to the second network device, the change in the RIB.

2. The method of claim 1, wherein identifying defined events in each of a plurality of applications includes receiving, in one of the plurality of network devices, configuration information defining a redundancy set having a master redundancy state and a standby redundancy state, wherein the configuration information includes one or more redundancy policies associated with the redundancy set, the one or more redundancy policies including a service redundancy policy that defines changes to be made in a service when the first defined event is detected.

3. The method of claim 1, wherein each network device includes an application layer, wherein modifying the first signal-route includes changing, in the application layer, a bit in a signal route vector, and modifying a routing policy on the first network device based on the change in the bit.

4. The method of claim 1, wherein advertising the change in the RIB includes sending a route update message from a routing protocol process executing on the first network device.

5. The method of claim 4, wherein the route update message includes a route cost attribute.

6. The method of claim 1, wherein advertising the change in the RIB includes executing an as-path-prepend command.

7. The method of claim 6, wherein the as-path-prepend command increases a route cost attribute.

8. The method of claim 1, wherein advertising the change in the RIB includes advertising a different Virtual Router Redundancy Protocol (VRRP) priority for the first signal-route than previously advertised.

9. The method of claim 1, wherein advertising the change in the RIB includes setting a local-preference value.

10. The method of claim 1, wherein modifying one or more services provided by the second network device includes modifying an application state in an application executing on the second network device based on the change in the RIB.

11. The method of claim 1, wherein each signal-route has a state, wherein the state of each signal-route is stored as a signal-route vector on the first and second network devices.

12. The method of claim 11, wherein modifying one or more services provided by the second network device includes modifying an application state in an application executing in the application layer of the second network device in response to detecting a change in the signal-route vector on the second network device.

13. The method of claim 12, wherein modifying one or more services provided by the second network device further includes marking bits used by a firewall engine executing on the second network device.

14. The method of claim 12, wherein modifying one or more services provided by the second network device further includes changing a firewall rule for a firewall engine executing on the second network device.

15. The method of claim 1, wherein identifying defined events in each of the plurality of applications includes defining a service redundancy policy associated with each defined event.

16. The method of claim 15, wherein modifying one or more services provided by the second network device includes changing a firewall rule as defined in the service redundancy policy.

17. The method of claim 15, wherein modifying one or more services provided by the second network device includes applying the services only when the first signal-route exists.

18. A system, comprising:
a network; and
a plurality of network devices connected by the network, wherein each network device includes a memory and one or more processors connected to the memory, wherein the memory stores instructions that, when executed by the one or more processors, cause the one or more processors to:
identify defined events in each of a plurality of applications, wherein the plurality of applications includes a first application and wherein the defined events include a first defined event associated with the first application;
assign a signal-route to each defined event, wherein assigning a signal-route to each defined event includes assigning a first signal-route to the first defined event;
execute the first application;
detect occurrence of the first defined event within the executing first application; and
in response to detecting occurrence of the first defined event within the first application executing on the first network device, modify one or more services provided by another one of the network devices, where modifying one or more services includes:
modifying a routing information base (RIB), wherein modifying includes changing the RIB by adding the first signal-route to or removing the first signal-route from the RIB; and
advertising the change in the RIB.

19. The system of claim 18, wherein each signal-route is a static route.

20. A non-transitory computer-readable storage medium storing instructions that, when executed, cause one or more processors to:
identify defined events in each of a plurality of applications, wherein the plurality of applications includes a first application and wherein the defined events include a first defined event associated with the first application;
assign a signal-route to each defined event, wherein assigning a signal-route to each defined event includes assigning a first signal-route to the first defined event;
execute the first application;
detect occurrence of the first defined event within the executing first application; and
in response to detecting occurrence of the first defined event within the first application, modify one or more services, where modifying one or more services includes:
modifying a routing information base (RIB), wherein modifying includes changing the RIB by adding the first signal-route to or removing the first signal-route from the RIB; and
advertising the change in the RIB.

* * * * *